United States Patent [19]

Inamiya

[11] Patent Number: 5,160,935
[45] Date of Patent: Nov. 3, 1992

[54] POSITIONING METHOD UTILIZING ARTIFICIAL SATELLITES IN GEOSYNCHRONOUS ALTITUDE ORBITS

[75] Inventor: Kenichi Inamiya, Kanagawa, Japan

[73] Assignee: Mitsubishi Denki Kabushiki Kaisha, Japan

[21] Appl. No.: 799,443

[22] Filed: Nov. 27, 1991

[30] Foreign Application Priority Data

Nov. 28, 1990 [JP] Japan .................................. 2-328438
Apr. 22, 1991 [JP] Japan .................................. 3-90628

[51] Int. Cl.$^5$ ........................... G01S 5/12; H04B 7/185
[52] U.S. Cl. ...................................................... 342/357
[58] Field of Search ........................................ 342/357

[56] References Cited

U.S. PATENT DOCUMENTS

| 4,918,609 | 4/1990 | Yamawaki | 342/357 |
| 4,987,420 | 1/1991 | Inamiya | 342/457 |
| 5,017,926 | 5/1991 | Ames et al. | 342/357 |

OTHER PUBLICATIONS

Milliken et al., "Principle of Operation of NAVSTAR and System Characteristics", Navigation: Journal of the Institute of Navigation, vol. 25, No. 2, Summer, '78.

Primary Examiner—Gilberto Barrón, Jr.
Attorney, Agent, or Firm—Wolf, Greenfield & Sacks

[57] ABSTRACT

A method of positioning an observation point utilizing artificial satellites. In order to make it possible to make a range measurement in areas within the latitude of 65 degrees where almost all people in the world reside, a predetermined first number of satellites, for example, ten satellites are placed in geosynchronous orbits, the inclination angle thereof being set to about six degrees. The respective satellites are placed so that the mean anomalies thereof are equally separated. A control station, which keeps track of a predetermined second number of satellites, monitors signals indicating times and frequencies generated from the satellites and compares the times and frequencies with national standard time and frequency obtained in a ground station, thereby enabling the position of the observation point to be determined. The control station frequently transmits commands for compensating clocks mounted in the satellites whereby each satellite generates a highly accurate signal for range measurement.

8 Claims, 22 Drawing Sheets

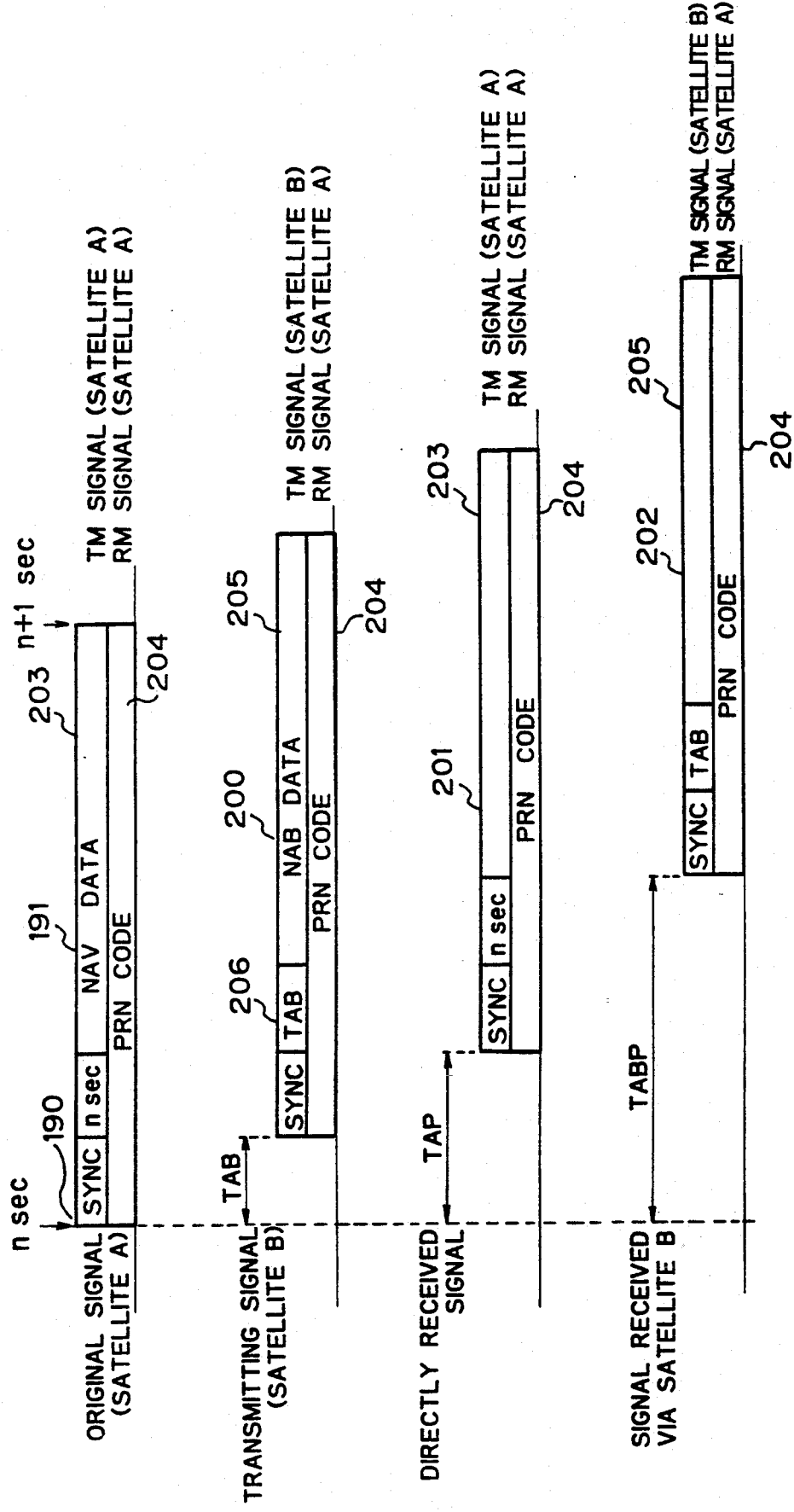

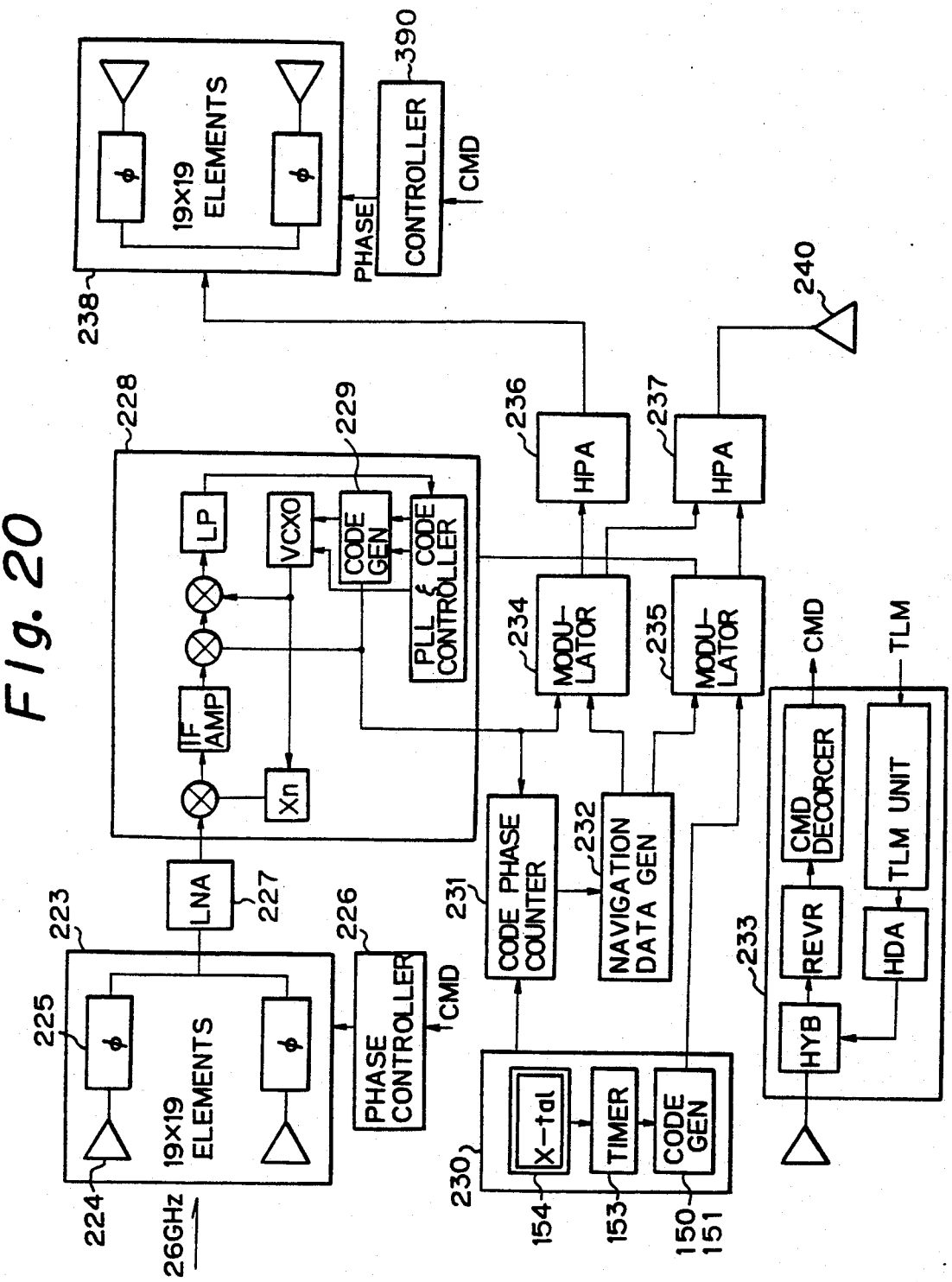

POSITIONING METHOD UTILIZING ARTIFICIAL SATELLITES IN GEOSYNCHRONOUS ALTITUDE ORBITS

BACKGROUND OF THE INVENTION

1. Field of the Invention

The present invention relates to a method of determining the position of a signal receiving point by processing data included in signals transmitted from artificial satellites in geosynchronous altitude orbits.

2. Description of the Prior Art

Conventional radio navigation methods range from those having oscillation sources on the earth such as Decca, Omega and Loran-C systems to NNSS (Navy Navigation Satellite System) and GPS (Gloval Positioning System) utilizing artificial satellites. Systems utilizing artificial satellites can dispose criteria of position determination in cosmic space. Therefore, it is possible to improve an accuracy of position determination by expanding the scope of position determination and mounting high-grade apparatuses on the satellites. Of these systems, NNSS utilizes the Doppler effect, while GPS utilizes measurement of distance based on time measurement. The latter provides many excellent performances in comparison with the former and will become a leading system in forthcoming navigation satellite systems. In comparison with the present invention, such GPS system will be explained as a typical prior art.

FIG. 1 indicates the arrangement of artificial satellites in GPS. The reference numerals (300), (301), (302), (303) denote NAVSTARs (NAvigation System with Timing and Ranging) for GPS and their positions are indicated as A', B', C' and D'. Each NAVSTAR has a precise atomic clock which generates a highly accurate clock signal and accurately expresses the present time with reference to the beginning of a week through calibration by timing information received from a control station. The control station decides the orbit from tracking data of NAVSTAR, and thus, when a time is once selected, the position of NAVSTAR can be decided. Therefore, if an observer 304 were at NAVSTAR's position, he would detect a current time at NAVSTAR and know the position from the detected time and the orbital information. Next, it will be discussed that an observer 304 take a position P' where he can observe NAVSTARs position. Here, it is assumed that the observer has a timing device which is not so accurate and includes a fixed error relative to a reference time. It is also assumed that the observer performs measurements at a time $Tno+\Delta t$, where $Tno$ indicates a correct current time and $\Delta t$ indicates a fixed error inherent to the observer. In this case, assuming that NAVSTARs (300), (301), (302), (303) are observed by the observer at Tn1, Tn2, Tn3 and Tn4, respectively, these times respectively include delays corresponding to the distances between the observer and the satellites.

From the relationship between the observed time and the position of NAVSTAR, the following equations can be established.

$$A'P = C(Tno+\Delta t - Tn1)$$
$$B'P = C(Tno+\Delta t - Tn2)$$
$$C'P = C(Tno+\Delta t - Tn3)$$
$$D'P = C(Tno+\Delta t - Tn4) \quad (1)$$

where, C denotes the velocity of light.

The equations (1) consist of four kinds of equations including, as unknown numbers, three values representing observer's three-dimensional position and $\Delta t$. Therefore, these equations have solutions and provide the position of the observer, which allows the observer to calibrate his clock.

NAVSTARs move in a circular orbit once in 12 hours, and the altitude of the orbit is 20, 183 km, the orbit inclination angle being 55 degrees. In such an orbit, three satellites are located at equal intervals. Six such orbits have been prepared and therefore 18 satellites in total make the flight along the orbits. These satellites are arranged so that four NAVSTARs can always be observed from any point on the earth.

One control station and four monitor stations are provided in the NAVSTAR system, and when four NAVSTARs exist within a visibility of each station, data can be acquired and necessary commands can be transmitted. Orbital data can be processed with a data processing facility on the basis of the data acquired. For the control of time, the timing device is calibrated by the primary time standard.

In the case of GPS, at least 18 NAVSTARs are required for conducting position determination at every place on the earth. Moreover, the NAVSTAR system requires highly precise time and frequency data in order to generate source data for measurement of range. However, the control station calibrates time and frequency at a period of a week and therefore NAVSTARs require atomic clocks to suppress any fluctuation of time and frequency to within an allowable range, thus resulting in an increase in costs.

SUMMARY OF THE INVENTION

It is therefore an object of the present invention to provide a positioning method which solves the problems of the prior art as explained above and determines the position of an observer as accurately as the prior art with simplified means.

In the present invention, a predetermined number M of satellites, for example, 10 satellites are disposed in geosynchronous altitude orbits for range measurement in the areas within a latitude of 65 degrees where a great part of the world's population resides. The inclination angle of the geosynchronous orbits is set to about six degrees. The respective satellites are disposed so that the mean anomalies of neighbouring two satellites are equally separated from each other. A control station which always keeps track of a predetermined number N ($<M$) of satellites monitors time and frequency generated by each satellite and the position of an observation point can be determined by comparing such time and frequency data with highly precise reference time and frequency data generated from a ground station. Moreover, artificial satellites are capable of generating signals for highly precise range measurement by frequently receiving compensation commands from the control station.

In one embodiment of a positioning method according to the present invention, four artificial satellites are disposed in geosynchronous altitude orbits, an orbit inclination angle being set to almost six degrees and the mean anomalies of adjacent two artificial satellites being separated by about 120 degrees from each other, so that the four satellites are simultaneously in the visibility of the observation point. A first satellite among the four artificial satellites transmits, to the observation point and a subsequent second satellite, a range measuring signal having a fixed phase at an integral second time based on a time signal calibrated in the control station. In the second satellite, phase comparison is conducted between the range measuring signal received from the first satellite and a range measuring signal produced at a certain time in the second satellite. The second satellite transmits phase comparison information and the range measuring signals transmitted from the first satellite and also generated in itself to the observation point and simultaneously transmits the range measuring signal received from the first satellite to a subsequent third satellite. As explained above, the four satellites sequentially transmit range measuring signals and phase comparison information between adjacent two satellites to the observation point. In the observation point, differences between the ranges of the satellites and observation point are calculated for each pair of adjacent two satellites selected from the four satellites on the basis of the times of arrival of the range measuring signals, the times of transmission thereof detected from the range measuring signals and predicted orbital positions of the four satellites obtained from the control station, whereby the position of the observation point can be determined.

In summary, four artificial satellites in geosynchronous altitude orbits become a group and a reference satellite generates a range measuring signal in synchronism with time signal. This range measuring signal is transmitted to an observation point and relayed sequentially from one satellite to the satellite subsequent thereto. The satellite which has received such a range measuring signal from the preceding satellite then transmits this signal and a time signal to the observation point and same case to the satellite subsequent thereto. Such a process is applied to the four satellites, whereby the observer determines the position thereof based on such range measuring signals received from the respective satellites.

Alternatively, when a range measuring signal is received from a first satellite, a second satellite sends such a received range measuring signal back to the first satellite.

In the first satellite, the phase of the transmitted range measuring signal is compared with the phase of the returned range measuring signal and a difference in phase is detected. This phase difference is transmitted to the second satellite via the control station. In the second satellite, both phase comparison information and in some cases the range measuring signal received from the first satellite are sent simultaneously to the observation point and the range measuring signal received from the first satellite is transmitted to a third satellite. The remaining operations are similar to those described in reference to the above embodiment.

Alternatively, upon reception of a range measuring signal from a first satellite, a second satellite sends such a received range measuring signal back to the first satellite.

In the first artificial satellite, the transmitted range measuring signal and the returned range measuring signal are transmitted to a control station. In the control station, the phases of the two range measuring signals are compared to detect a difference therebetween and the detected difference is then transmitted from the control station to the second satellite. The second satellite simultaneously transmits phase comparison information and the range measuring signal received from the first satellite to the observation point and in some cases also transmits the range measuring signal sent from the first satellite to a subsequent third satellite.

In the above embodiments, a hyperboloid drawn by putting adjacent two satellites on the focuses is assumed for each pair of adjacent satellites and the position of the observation point is determined as an intersecting point of the hyperboloids.

These and other objects and advantages will become more apparent from the following detailed description with reference to the accompanying drawings.

BRIEF DESCRIPTION OF THE DRAWINGS

FIG. 18 is a diagram indicating signals transmitted from adjacent satellites and signals received at an observation point in the positioning method according to the present invention;

FIG. 20 is a diagram indicating the construction of a transceiver (transmitter/receiver) mounted in a satellite for implementing the positioning method according to the present invention.

DESCRIPTION OF PREFERRED EMBODIMENT

A measurement principle for position determination utilizing artificial satellites will be first explained hereunder.

Figure 1:
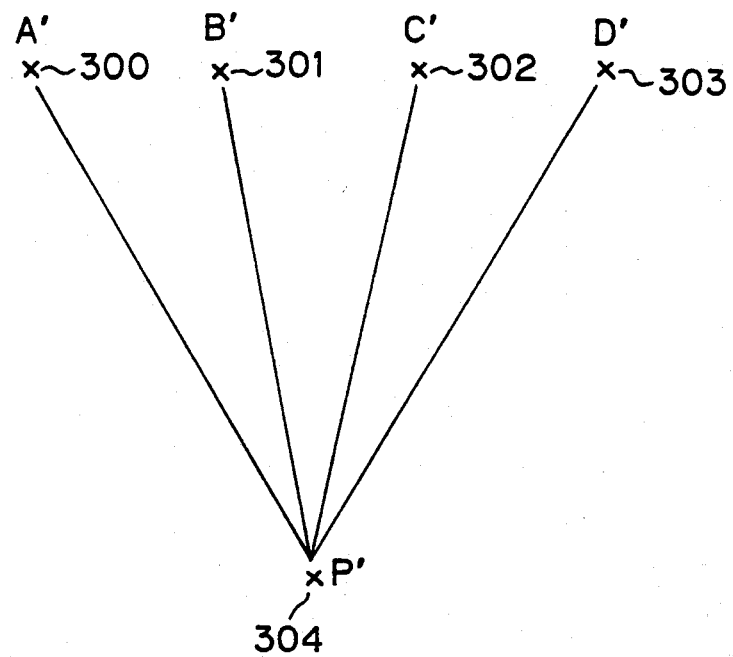
FIG. 1 indicates a positional relationship between satellites and an observing point on the earth in a known GPS.
Figure 2:
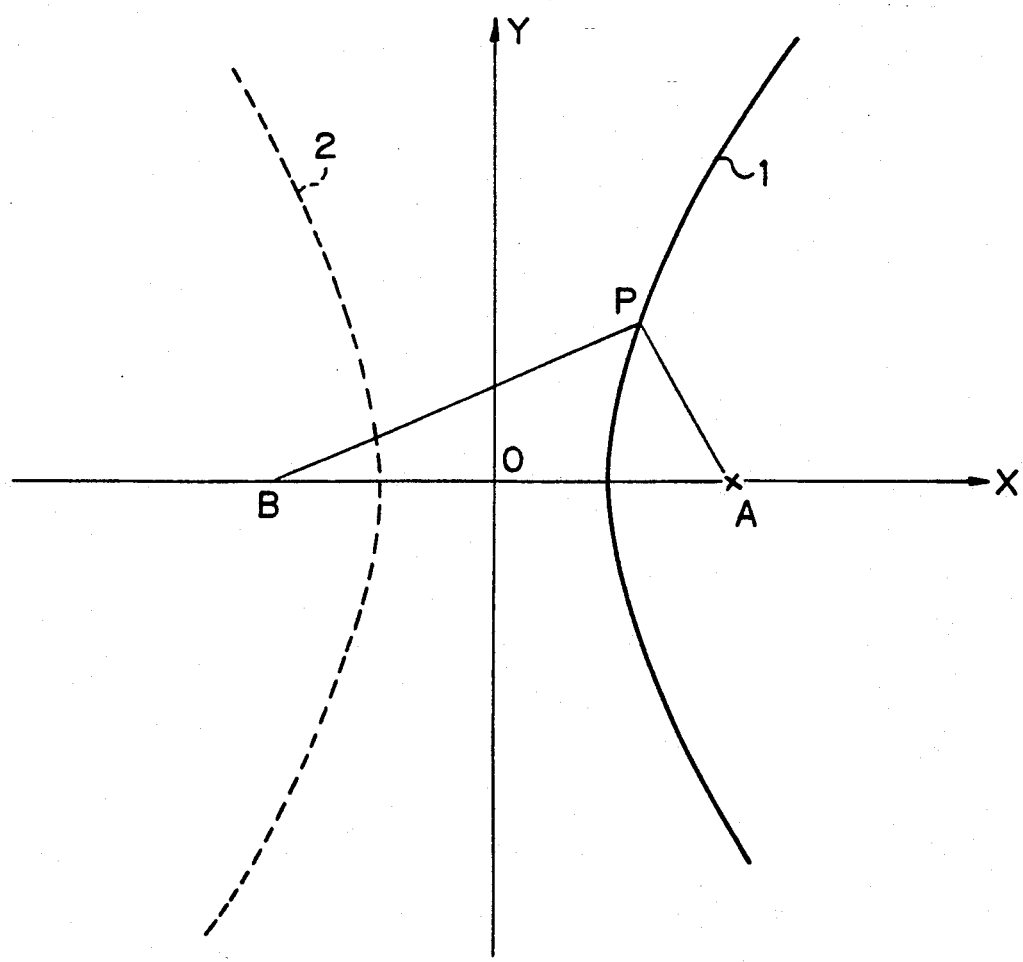
FIG. 2 is used to explain the case where an observation point lies on hyperbolas drawn by putting two satellites on the focuses.

In FIG. 2, two satellites are used and range measurement is made in a two-dimensional space. The symbols A, B indicate artificial satellites located on orbits; X an axis connecting the satellites A, B; Y an axis perpendicularly crossing the axis X at the origin, the center of the axis X; and P a point where the difference between ranges between the point P and the satellites A and B becomes constant. The numeral 1 designates a hyperbolic locus of the point P on the X-Y plane; 2 a hyperbola symmetrical to the hyperbola 1 with respect to the axis Y.

A hyperbola on the X-Y plane can be expressed by the following formula:

$$\frac{x^2}{a_1^2} - \frac{y^2}{b_1^2} = 1 \qquad (2)$$

Here, the focal distance and the eccentricity thereof are defined by $$f = \pm a_1 e, \ e = (\sqrt{a_1^2 + b_1^2})/a_1$$

and the difference between the distances between the point P and the focuses is defined by $f = 2a_1$.

When an observation point is set to the point P, the difference between the ranges between the two satellites A, B and the observation point is measured in the present invention. In FIG. 2, the hyperbolas 1, 2 can be drawn based on the measured difference in range. The observation point P may exist in any of the hyperbolas 1, 2, but when the information as to which of the ranges AP and BP is larger is obtained, it is possible to decide on which hyperbola the observation point P exists on. Here, it is assumed that the observation point P lies on the hyperbola 1.

Figure 3:
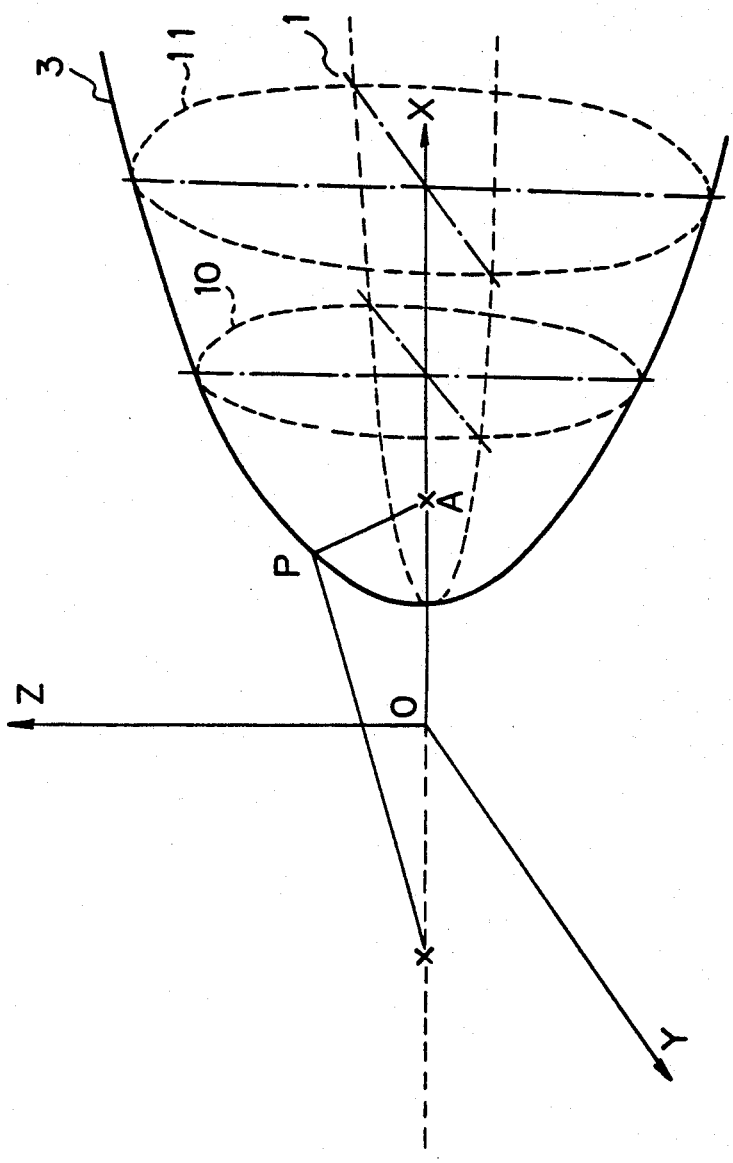
FIG. 3 is a diagram indicating a positional relationship between hyperboloids obtained by rotating the hyperbolas about the axis X in FIG. 2 and the observation point.

In FIG. 2, explanation has been made of a case where measurement is performed in two-dimensional space. However, actual phenomena occur in a three-dimensional space. Therefore, a three-dimensional hyperboloid 3 of the X-Y-Z coordinates is obtained by rotating the hyperbola 1 on the X-Y plane about the axis X (FIG. 3). The numerals (10) and (11) denote circles defined by cutting the hyperboloid at planes parallel with the Y-Z plane.

A group of the positions P on the X-Y-Z coordinates where the difference in range, AP BP, indicated in FIG. 2 is constant creates a hyperboloid 3 which is expressed as follows:

$$\frac{x^2}{a_1^2} - \frac{y^2 - z^2}{b_1^2} = 1 \qquad (3)$$

In the case that the observation point P lies on the axis X in the arrangements of FIG. 2 and FIG. 3, the hyperbola 1 and the hyperboloid 3 become straight lines. In the present invention, however, such an arrangement does not occur because the artificial satellites in geosynchronous orbits are observed from the observation point P near the ground on the earth.

Figure 4:
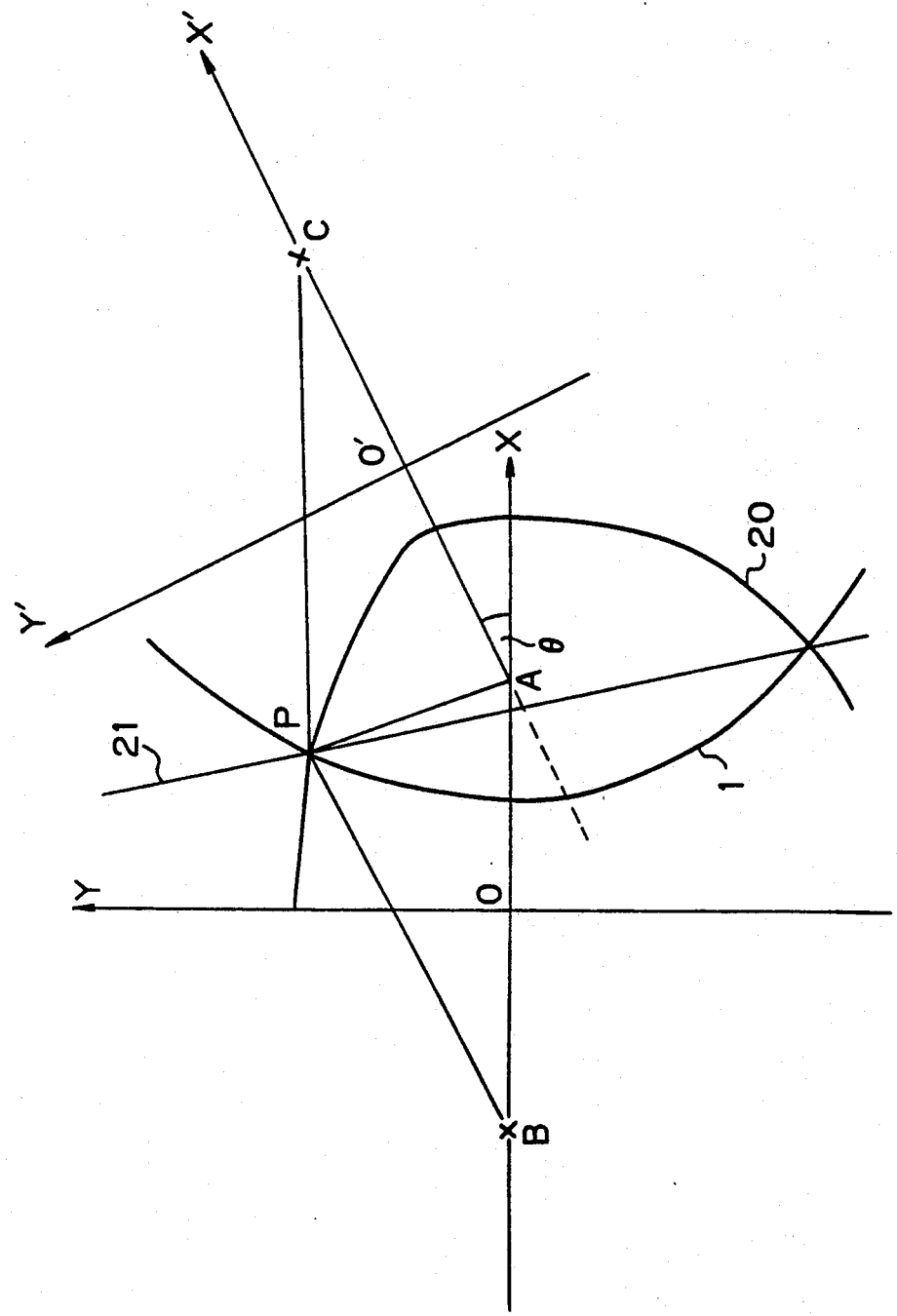
FIG. 4 is a diagram indicating a positional relationship between three artificial satellites and an observation point.

FIG. 4 shows a case where three satellites are used for range measurement. Two satellites A, B are located as shown in FIG. 2 and another satellite C is assumed to be located on the X' axis of another X'-Y' coordinates on the same X-Y plane. Here, the line connecting the satellites A, C is defined as the axis X', and the axes X and X' intersect at an angle $\theta$. Numeral 20 denotes a hyperbola including the observation point P where the difference in range, AP CP, becomes constant; and 21 a straight line passing two points where the hyperbolas 1, 20 intersect.

The observation point P exists satisfying a condition where the differences between the ranges between the point P and the satellites A, B and between the point P and the satellites A, C, that is, AP BP and AP CP, becomes constant. On the two hyperbolas 1, 20, such differences in range become equal at the two intersecting points of the hyperbolas.

Figure 5:
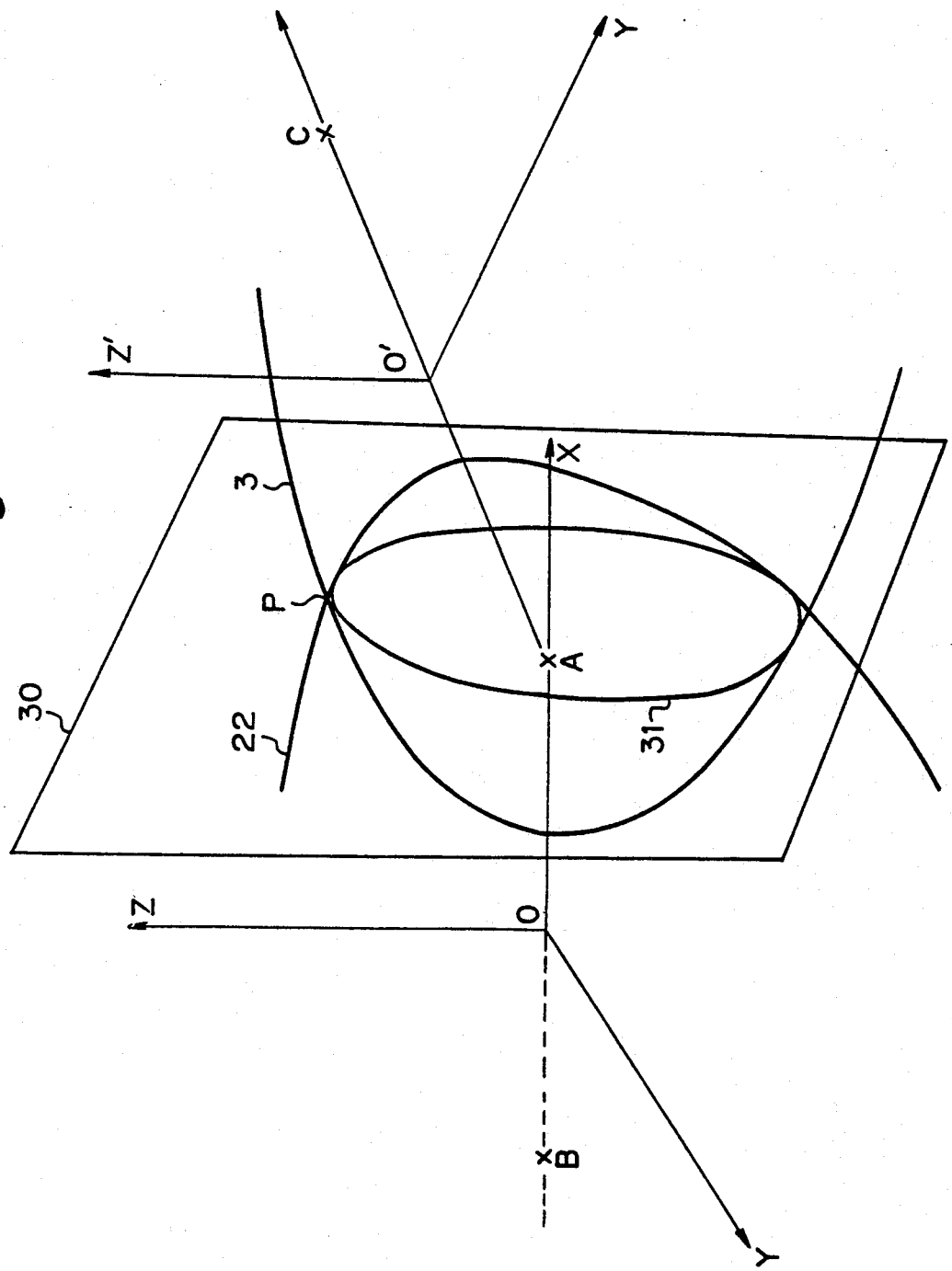
FIG. 5 illustrates intersecting points of two hyperboloids obtained by rotating the hyperbolas about the axes X and X' in FIG. 4.

Next, the discussions on the X-Y, X'-Y' planes made with reference to FIG. 4 will be expanded to three-dimensional phenomena on the X-Y-Z, X'-Y'-Z' coordinates in FIG. 5. Numeral 22 denotes a hyperboloid which is obtained by rotating the hyperbola 20 about the axis X'; 30 a plane including the intersecting points of the two hyperboloids 3 and 22; and 31 a quadratic curve consisting of the intersecting points of the two hyperboloids 3, 22.

The hyperboloids 3, 22 on the X-Y-Z and X'-Y'-Z' coordinates are expressed by the following formulae:

$$\frac{x^2}{a_1^2} - \frac{y^2 + z^2}{b_1^2} = 1 \qquad (4)$$

$$\frac{x'^2}{a_2^2} - \frac{y'^2 + z'^2}{b_2^2} = 1 \qquad (5)$$

Relationship between the X-Y-Z coordinates and X'-Y'-Z' coordinates is expressed as follows:

$$\begin{pmatrix} x' \\ y' \\ z' \end{pmatrix} = - \begin{pmatrix} \cos\theta & \sin\theta & 0 \\ \sin\theta & \cos\theta & 0 \\ 0 & 0 & 1 \end{pmatrix} \begin{pmatrix} x \\ y \\ z \end{pmatrix} + \begin{pmatrix} -e_1 a_1 \sin\theta - e_2 a_2 \\ e_1 a \sin\theta \\ 0 \end{pmatrix} \qquad (6)$$

where, the eccentricity $e = (a^2 + b^2)/a$.

Since it is assumed that the X-Y plane and the X'-Y' plane are on the same plane, $$z = z' \qquad (7)$$

When z is deleted from the formulae (3) and (5) based on the conditions of formula (7), then $$\frac{b_1^2}{a_1^2} x^2 - \frac{b_2^2}{a_2^2} x'^2 - (y^2 - y'^2) = b_1^2 - b_2^2 \quad (8)$$

From the formula of a hyperbola, it can be said that a ratio of the length between a point on the hyperboloid and the focus to the length between the focus and the directrix is equal to the eccentricity. On the X-Y and X'-Y' planes, the fact that the hyperbola 1 exists in the first and fourth quadrants and the hyperbola 20 in the second and third quadrants lead to the following formula:

$$AP = |e_1 x - a_1| = |e_2 x + a_2| \quad (9)$$

When the sign is considered in the arrangement of FIG. 4, the formula (9) can be modified as follows:

$$e_1 x - a_1 = (e_2 x + a_2) \quad (10)$$

The formula (10) can be established not only in the X-Y, X'-Y' planes but also in the hyperboloids (FIG. 5) obtained by rotating a hyperbola about the axes X and X'.

Therefore, when the formula (10) is substituted for the formula (8) to obtain conditions in which the hyperboloids intersect, the formula of a straight line can be obtained.

$$K_1 x + K_2 y + K_3 = 0 \quad (11)$$

Here,
$K_1 = -2a_2(e_1 + e_2 \cos \theta)$
$K_2 = -2e_2 a_2 \sin \theta$
$K_3 = e_1^2 a_1^2 + 2e_1 e_2 a_1 a_2 \cos \theta + e_2^2 a_2^2 - (a_1 - a_2)^2 - (b_1^2 - b_2^2)$ The formula (11) does not depend on z and z', and indicates the plane 30 which is parallel to the axes A, Z' and includes the formula (10) of the X-Y-Z and X'-Y'-Z' coordinates.

The intersecting points of the formulae (3) and (5) are on the plane 30.

In the arrangement of FIG. 5 utilizing three artificial satellites, it can be understood that the observation point P exists on a circle or an ellipse, a quadratic curve, developed on the plane 30. If the altitude of the observation point P can be detected as a known number from other system, the observation point P can be determined.

However, three satellites are insufficient for positioning the observation point P from the differences between the ranges between the satellites and observation point.

Figure 6:
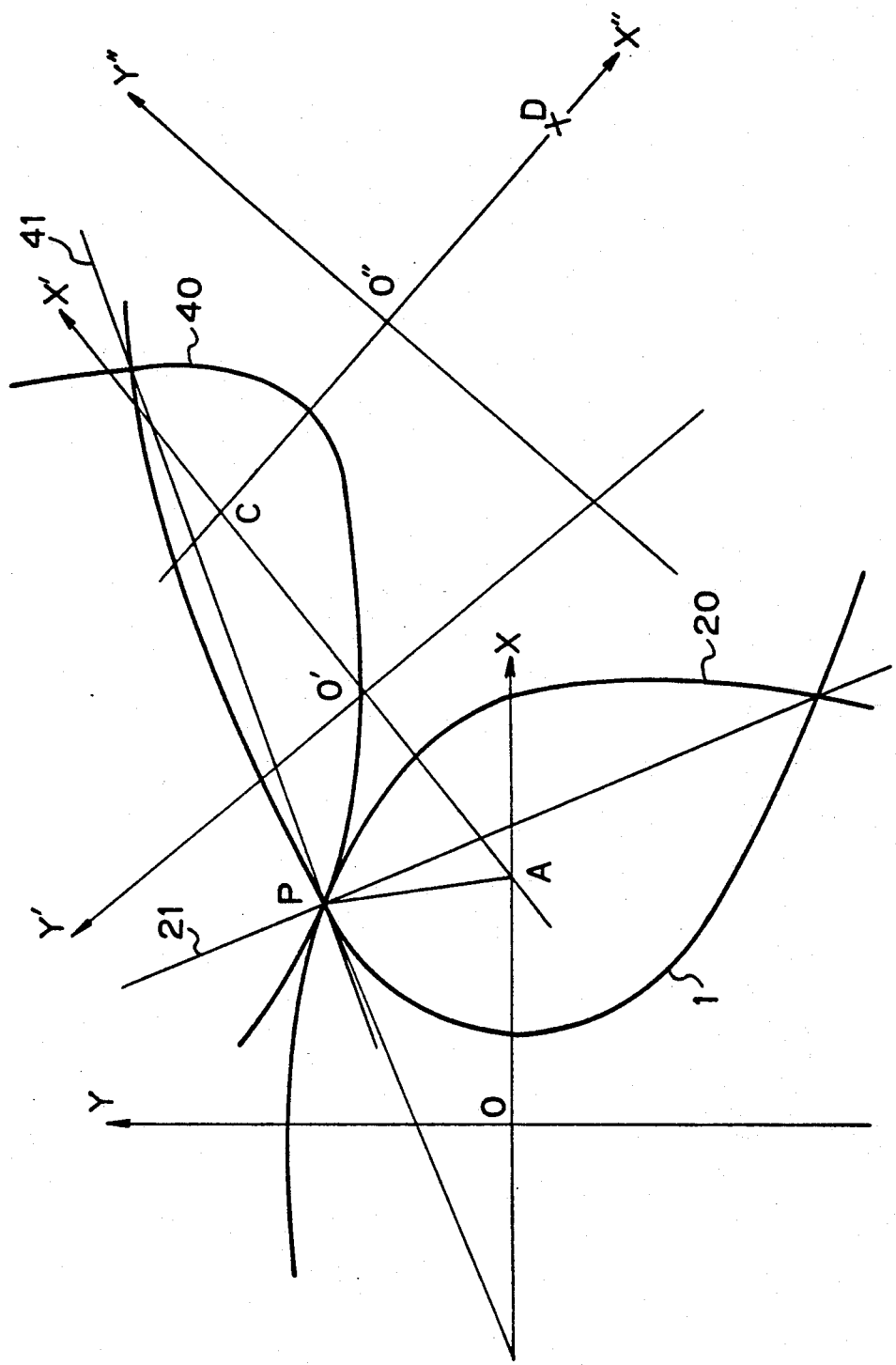
FIG. 6 is a diagram indicating a positional relationship between four satellites and an observation point.

FIG. 6 shows a two-dimensional arrangement of four artificial satellites A, B, C and D. Here, the line connecting the satellite C and the fourth satellite D is defined as the axis X''. Numeral 40 denotes a curve in which the difference between the ranges between the satellite C and observation point P and between the satellite D and observation point P that is, CP DP, becomes constant; and 41 a line passing the intersecting points of the hyperbolas 1 and 40.

As a result of newly adding the X''-Y'' coordinates and the fourth satellite D, the hyperbola 40 has been drawn, thereby enabling the difference between the ranges between the observation point P and satellite C and between the observation point P and satellite D, CP DP, to be observed.

The line 41 connecting the intersecting points of two hyperbolas 1, 40 can be obtained and it can be decided that the observation point exists at the intersecting point of two lines 21, 41. As explained above, the position of the observation point can be determined as an intersecting point of two lines by utilizing four satellites on the X-Y plane.

Figure 7:
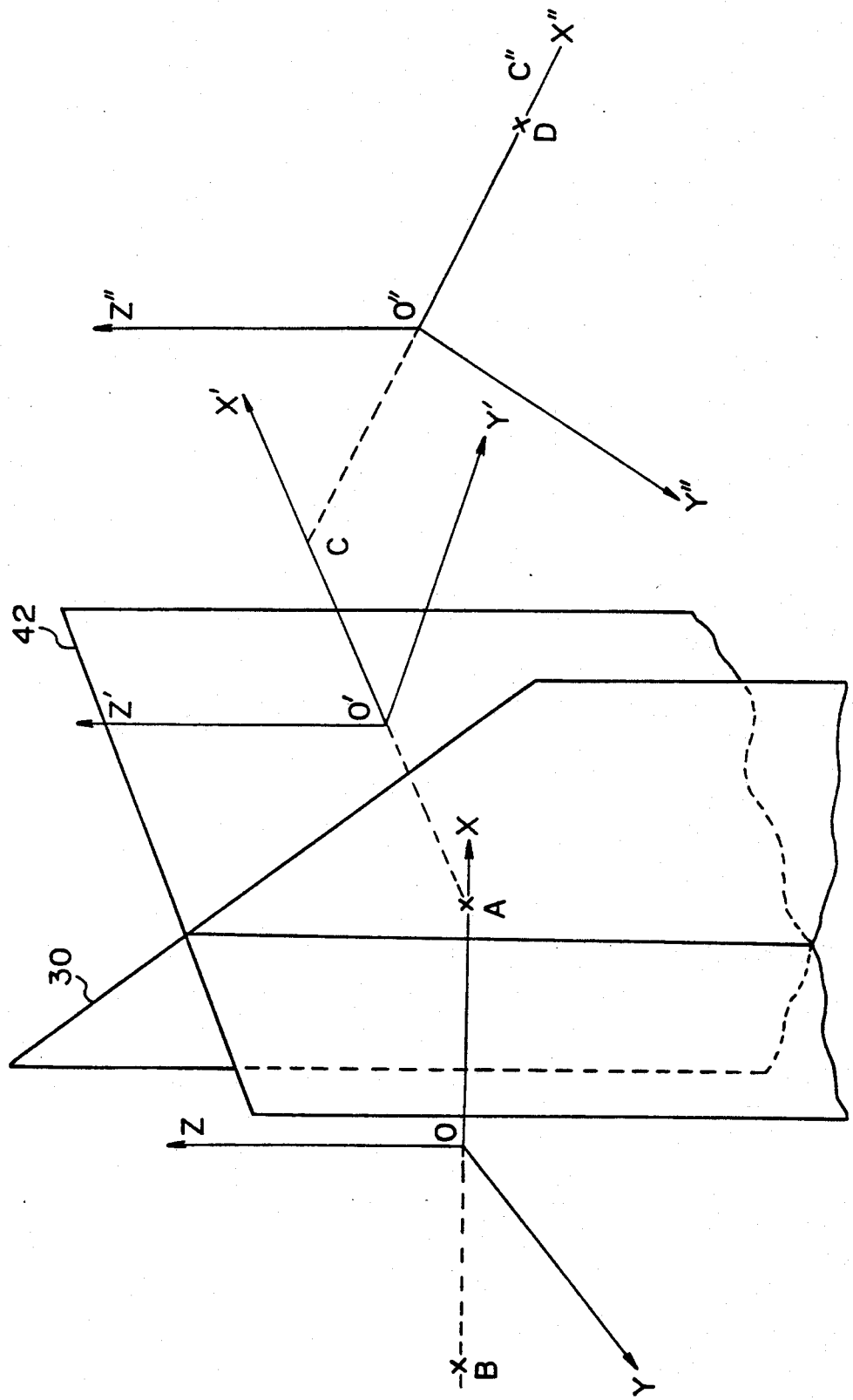
FIG. 7 illustrates intersecting points of three hyperboloids obtained by rotating the hyperbolas about the axes X, X' and X" in FIG. 6.

With reference to FIG. 7, it will be explained that a similar method can also be applied to a three-dimensional arrangement. Numeral 42 indicates a plane on which two hyperboloids intersect in a three-dimensional arrangement.

As explained with reference to FIG. 4, the plane 30 can be decided using the satellites A, B, C located in the X-Y-Z and X'-Y'-Z' coordinates, while the plane 42 can be decided using the satellites A, C, D located in the X-Y-Z, X'-Y'-Z' and X''-Y''-Z'' coordinates. It is thus decided that the observation point exists on the quadratic curve on these two planes, and that the observation point exists on the intersecting line of these two planes 30, 42.

The plane on which the observation point P exists can be obtained by an algebraic expression such as the formula (11). On the other hand, since it is difficult to algebraically obtain the position of the observation point P, proper solutions can be obtained through numerical analysis.

Figure 8:
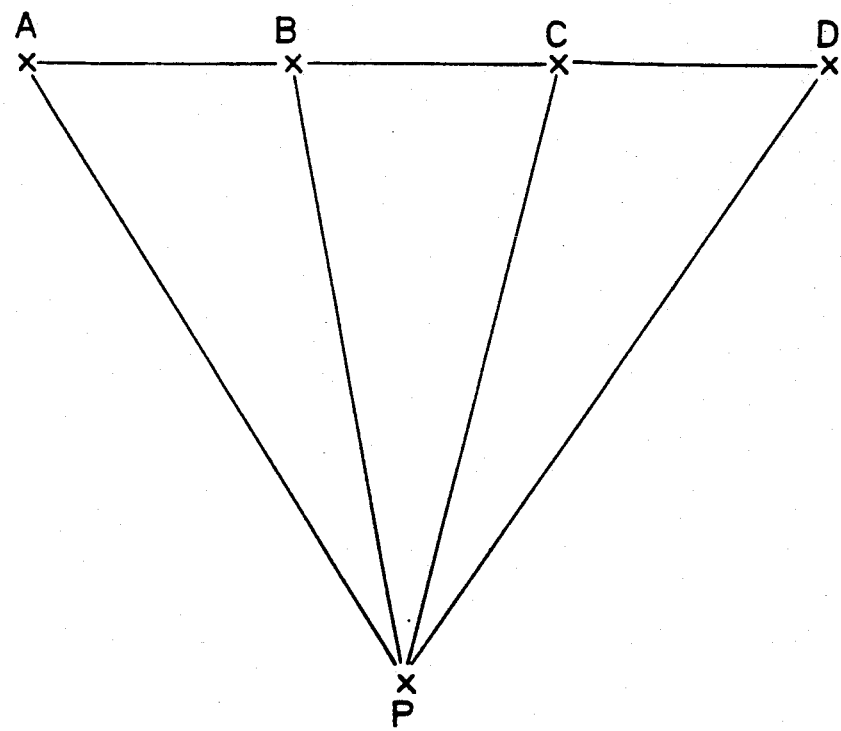
FIG. 8 is a diagram indicating a positional relationship between four satellites and an observation point in a positioning method according to the present invention.

An arrangement of satellites A, B, C, D and the observation point P is shown in FIG. 8. The coordinates of satellites A, B, C and D are respectively expressed as follows:

$(x_A, y_A, z_A)$ $(x_B, y_B, z_B)$ $(x_C, y_C, z_C)$ $(x_D, y_D, z_D) \quad (12)$ The coordinates of observation point P is defined as $(x, y, z). \quad (13)$ The coordinates of the point P are unknown numbers to be obtained.

Following three values $S_1$, $S_2$, $S_3$ are obtained as observed values.

$AP - BP = S_1$ $BP - CP = S_2$ $CP - DP = S_3 \quad (14)$

A sum of the differences between the observed values and the ranges between the observation point P and the satellites A, B, C, D is obtained by the following formula:

$$f(x, y, z) = (\sqrt{(x - x_A)^2 + (y - y_A)^2 + (z - z_A)^2} - \sqrt{(x - x_B)^2 + (y - y_B)^2 + (z - z_B)^2} - S_1)^2 + (\sqrt{(x - x_B)^2 + (y - y_B)^2 + (z - z_B)^2} - \quad (15)$$

$$\sqrt{(x-x_C)^2 + (y-y_C)^2 + (z-z_C)^2} - S_2)^2 +$$

$$(\sqrt{(x-x_C)^2 + (y-y_C)^2 + (z-z_C)^2} -$$

$$\sqrt{(x-x_D)^2 + (y-y_D)^2 + (z-z_D)^2} - S_3)^2$$

Since the function f(x, y, z) indicates only one minimum value at the observation point P calculations are repeated by the steepest inclination method using the position of an initially predicted observation point as initial values and the position of the observation point can be obtained arithmetically as the minimum value.

Figure 9:
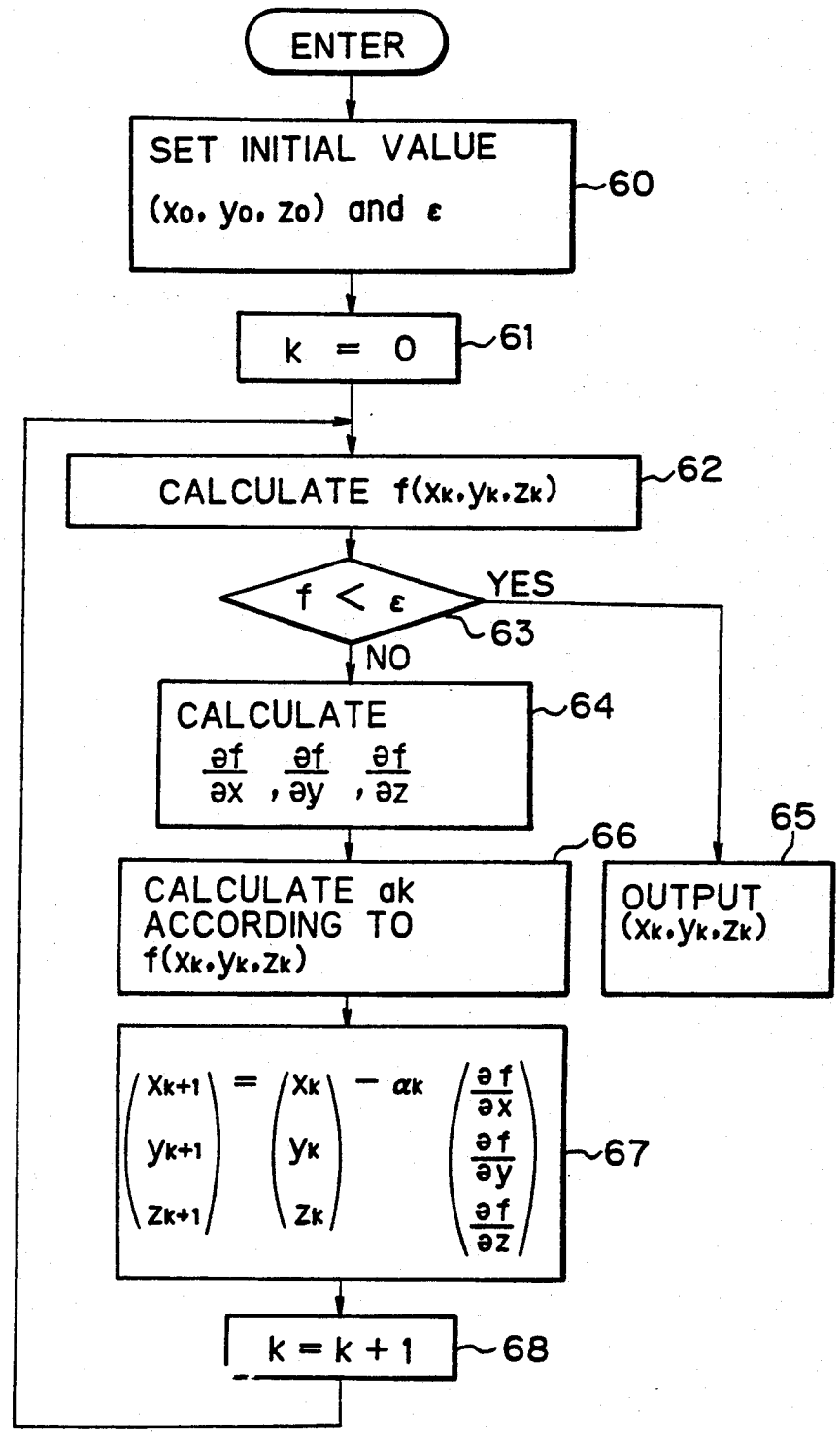
FIG. 9 is a flowchart indicating an algorithm for determining the position of the observation point in the positioning method according to the present invention.

An algorithm of such numerical calculation is shown in FIG. 9. Initial values are set in a step (60). It is preferable that the initial values should be set to values ($x_0$, $y_0$, $z_0$) which is not greatly different from the coordinates of the true observation point. Moreover, values should be preset such that repetitive calculations can be avoided when a value of the formula (15) obtained by substituting calculated values and observed values becomes minute. In a step (61), K=0 is first set for repetitive calculations. In a step (62), a value of formula (15) for ($x_k$, $y_k$, $z_k$) is calculated. In a step (63), the value calculated in the step (62) is compared with $\epsilon$. If f($x_k$, $y_k$, $z_k$) becomes smaller than $\epsilon$, the calculation is stopped and the values ($x_k$, $y_k$, $z_k$) at this time is output (step 65). When f$\geq \epsilon$, differential coefficients of the x, y, z components of the formula (15) are obtained in a step (64). In a step (66), a value $a_k$ which decides an amount of movement from the k-th point to the (k+1)th point is calculated. The value $a_k$ which indicates a rate of change in movement shows a wide change while f($x_k$, $y_k$, $z_k$) shows a large value, but shows a small change while f($x_k$, $y_k$, $z_k$) comes close to an extreme value. Thus, a value of $a_k$ should be set so that an extreme value of f can be obtained. It is an effective means to calculate a value of formula (15) before and after the point ($x_k$, $y_k$, $z_k$) in order to search an extreme value of f. In a step (67), the differential coefficients calculated in the step (64) are multiplied with $a_k$ to obtain amounts of movement of the respective components. Namely, values ($x_{k+1}$, $y_{k+1}$, $z_{k+1}$) are set to be equal to the results obtained by substracting the k-th amount of movement from ($x_k$, $y_k$, $z_k$). Since differential values increase towards an extreme value, a vector value consisting of three components comes close to an extreme value through the shortest path when the number of steps changes from k to k+1. In a step (68), k is incremented by 1. Calculations are repeated until the condition for decision (f<$\epsilon$) of the step (63) can be attained. When f<$\epsilon$, values ($x_k$, $y_k$, $z_k$) is output.

Figure 10:
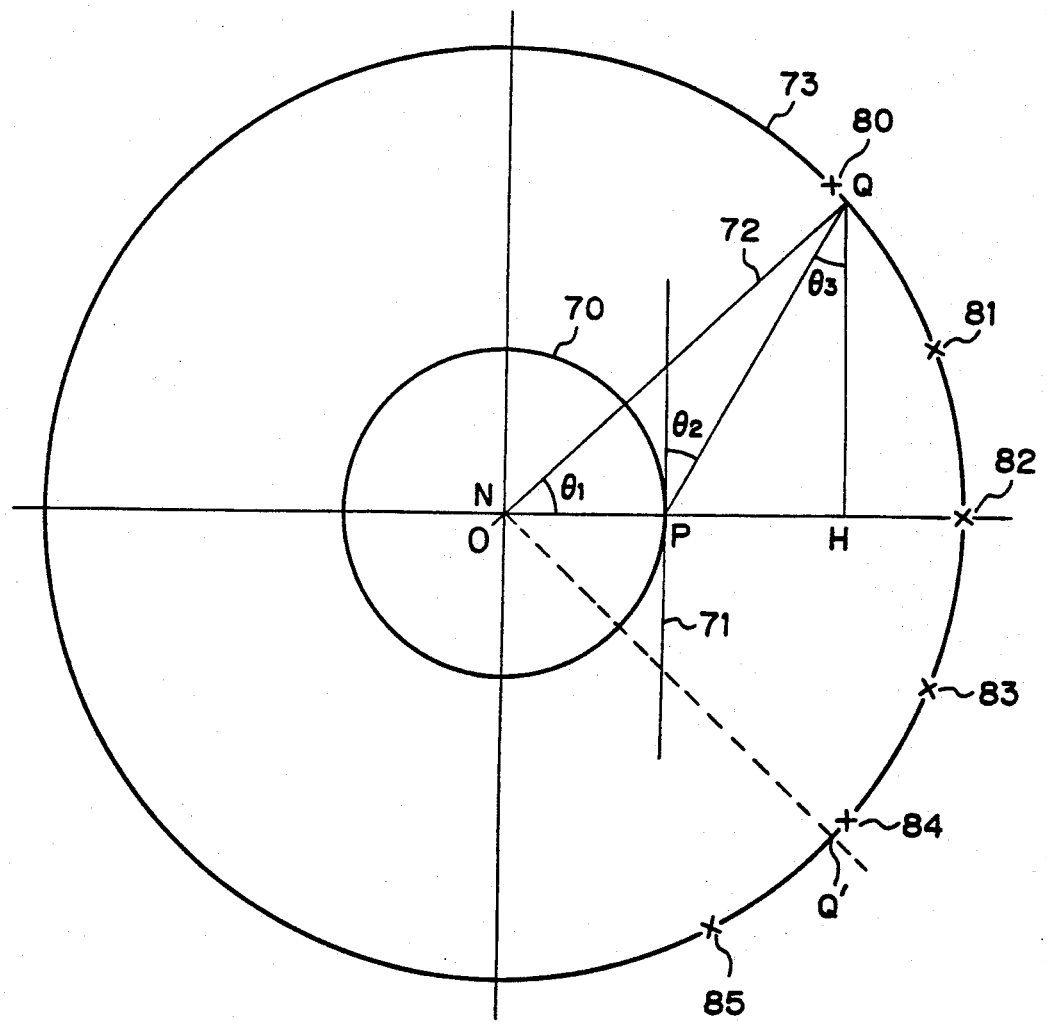
FIG. 10 is used to explain how satellites are located on geosynchronous orbits in the positioning method according to the present invention.

Next, locations of satellites in orbits will be schematically explained. Artificial satellites are located in geosynchronous orbits. An inclination angle of an orbit for a usual stationary satellite is rather small such as 0.05 degrees, but geosynchronous orbits with a large inclination angle are used in the present invention. FIG. 10 shows artificial satellites located on geosynchronous orbits when observed from a point just above the North pole. With this method, a situation whereby a plurality of satellites are simultaneously arranged on a straight line can be avoided.

In the present invention, it is required that four satellites should always be observed simultaneously from the observation point P. It is preferable that satellites are located in the position having a larger elevation angle when viewed from the ground surface in order for the field of sight not to be obstructed by high buildings, etc. However, in this case, the number of satellites increases. Assuming that satellites are located on the equatorial plane, relationships between the angles of elevation and the number of satellites covering the entire part of the earth are shown in Table 1. When the elevation angle is set to about 9 degrees as a reasonable value, the number of satellites is 10.

TABLE 1

| Elevation Angle | Number of Required Satellites |
|---|---|
| 1.3 degrees | 9 |
| 9.3 degrees | 10 |
| 16.1 degrees | 11 |

In FIG. 10, numeral 70 denotes the earth; numeral 71 the horizon at the observation point P; 72 a line interconnecting the center of the earth 0 and the geosynchronous orbit 73; $\theta_1$ an angle between the lines 72 and OP; and $\theta_2$ an elevation angle at the observation point P. Here, the foot of the perpendicular from the intersecting point Q of the line 72 and orbit 73 is defined by H and the angle between PQ and QH is defined by $\theta_3$. The radius of the earth is designated by r. 80, 81, 82, 83, 84 and 85 indicate artificial satellites on the geosynchronous orbit 73 in the present invention.

Assuming OQ=R, the following formula is established for $\triangle$OQH:

$$\tan\theta_3 = \frac{R\cos\theta_1 - OP}{R\sin\theta_1} \quad (16)$$

Since QH and the horizon 71 are parallel, then
$\theta_2 = \theta_3$

The elevation angle $\theta_2$ can thus be obtained. Table 1 shows relationships between the elevation angles and the number of satellites in such a case that four satellites are always located between Q and Q' on the orbit 73, Q' being the symmetrical point of Q with respect to OH.

Next, an orbit inclination angle will be explained. An inclination angle is required to be selected such that the distances of the satellites deviated to the South or North from the equatorial plane relative to the ranges between the satellites are significant for measurement of the ranges between the satellites. However, if an inclination angle is too large, a large elevation angle cannot be obtained in high latitude areas. Relationships between elevation angles, inclination angles at the latitude of 65 degrees or 70 degrees covering almost all regions of habitation on the earth are shown in Table 2.

TABLE 2

| Latitude | Elevation Angle | Distance from Equatorial Plane (Single side) |
|---|---|---|
| 70 degrees | 5 degrees | 5,689 km |
| 65 degrees | 5 degrees | 8,534 km |
|  | 10 degrees | 4,759 km |

Figure 11:
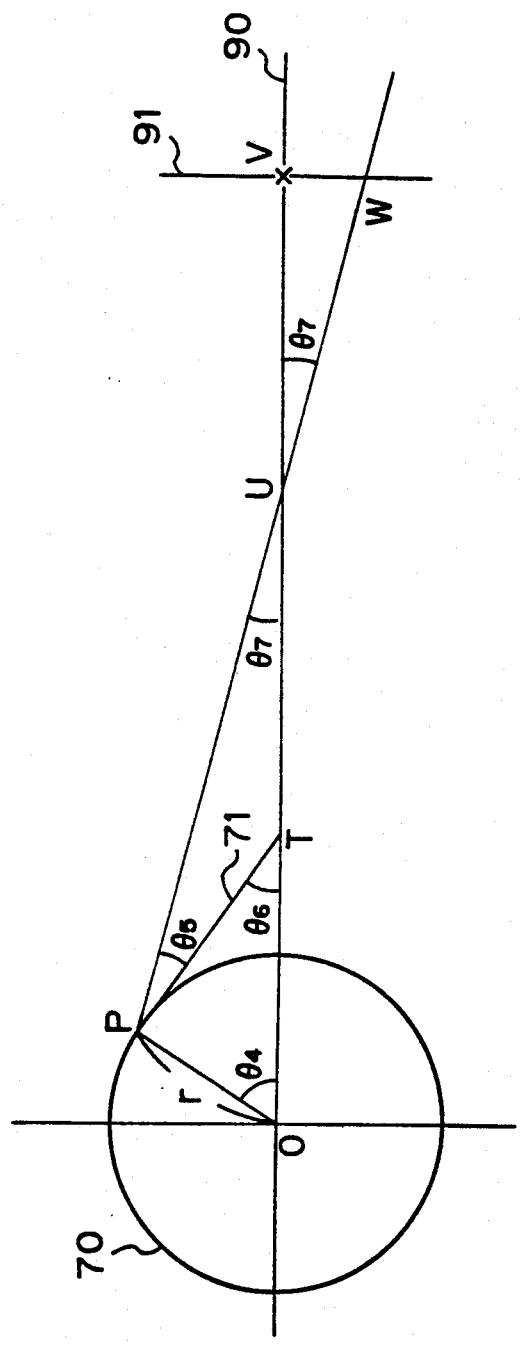
FIG. 11 illustrates a relationship between the inclination angle of a geosynchronous orbit and a movement of a satellite.

FIG. 11 shows a relationship between latitude, inclination angle and movement of a satellite.

$\theta_4$ denotes an angle between the equatorial plane 90 and OP; $\theta_5$ an elevation angle at the observation point P;

V a point at which the equatorial plane 90 and a geosynchronous orbit intersect; and 91 a line which passes the point V and orthogonally crosses the geosynchronous orbit. The horizon 71 intersects the equatorial plane 90 at a point T. A line segment which forms the elevation angle $\theta_5$ at the point P intersects the equatorial plane 90 at a point U. An extension line of the segment PU intersects the line 91 at a point W.

Since the latitude $\theta_4$ of the observation point P and the elevation angle $\theta_5$ are decided, then
$$\angle PTO = 90° - \theta_4 = \theta_6$$

$$\angle PUT = 180° - \theta_5 - (180° - \theta_6) = \theta_6 - \theta_5 = \theta_7$$

When the sine rule is applied to $\Delta PUT$, $$TU = \frac{TP}{\sin\theta_7} \sin\theta_5 = \frac{r\tan\theta_4}{\sin\theta_7} \sin\theta_5 \quad (17)$$

Next, $$UV = 42,000 - TU - \frac{r}{\cos\theta_4} \quad (18)$$

$$\angle PUT = \angle VUW = \theta_7$$

Therefore,
$$VW = UV \tan\theta_7 \quad (19)$$

Table 2 shows amounts of movement of a satellite from the equatorial plane when the satellite located on the equatorial plane is viewed from a point at a latitude of 65 or 70 degrees in the direction where the satellite goes away from the point P, namely, in the South or North.

Next, locations of satellites on geosynchronous orbits will be explained.

Figure 12:
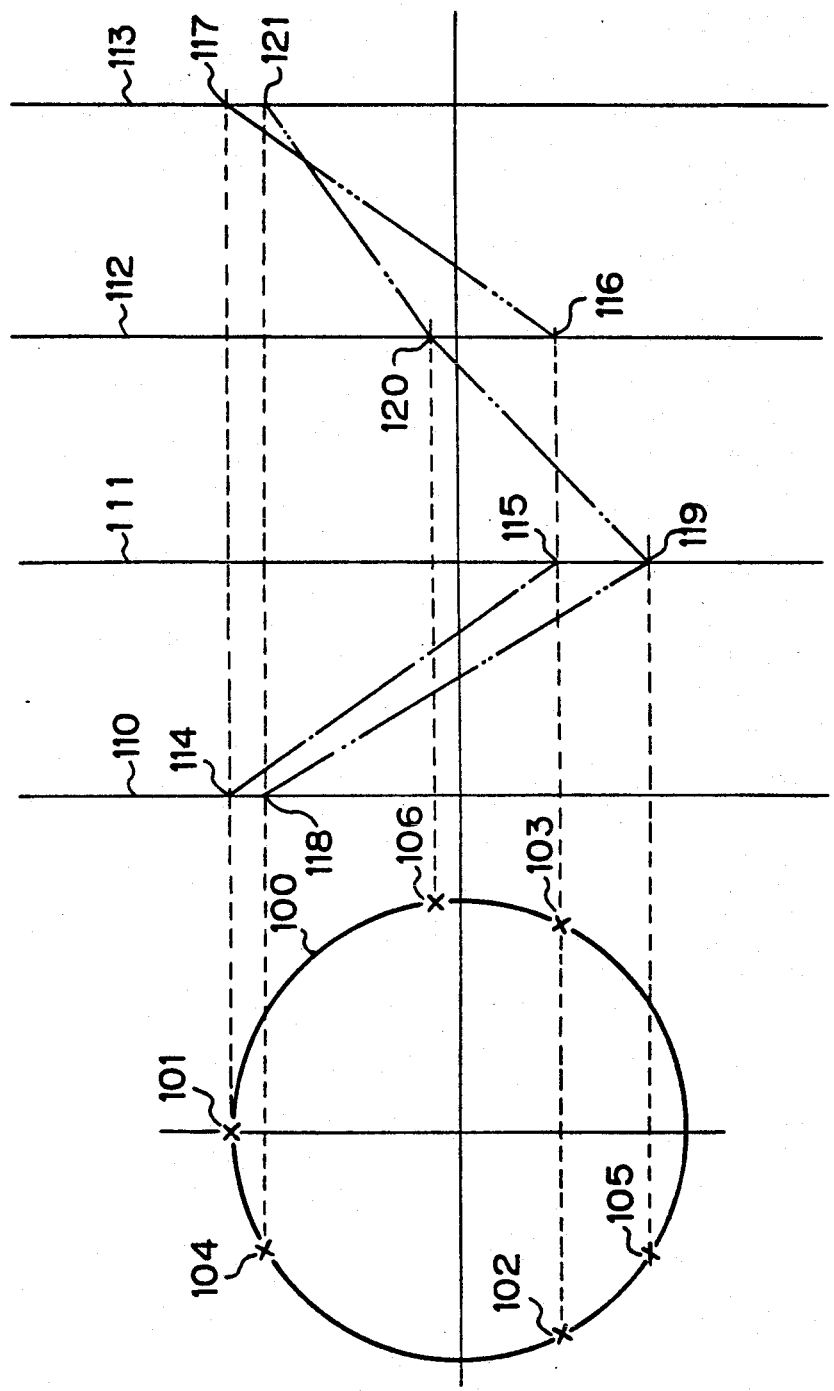
FIG. 12 is a diagram showing locations of four satellites within the visibility of an observation point and mutual positional changes of the four satellites in the positioning method according to the present invention.

FIG. 12 shows a circle for explaining phases and locations of satellites in geosynchronous orbits.

Numeral 100 denotes a circle for explaining phases. On the circle 100 four satellites are at positions 101, 102, 103 at a certain time and then move to positions 104, 105, 106 after the passage of certain time. Line segments 110, 111, 112 and 113 indicate regions in which the satellites move in the geosynchronous orbits having a large inclination angle and located on the equatorial plane. In this figure, the regions 110 113 are indicated by straight lines, but the satellites actually show so-called a character-8 characteristic. Numeral 114, 115, 116, 117, 118, 119, 120 and 121 show the positions of the satellites respectively corresponding to the positions 101 106 on the circle 100.

In the present invention, it is preferable that four satellites are distributed separately on a plane when viewed from the observer and a situation whereby four satellites are located on a straight line must be avoided.

The positions on the circle 100 indicates what points of the character-8 characteristic the satellites on the geosynchronous orbits should be located when the inclination angle of the geosynchronous orbits is increased. The satellites on the geosynchronous orbits are arranged in such a manner that the anomalies of adjacent satellites are separated by about 120 degrees at the same point in time. The actual positions on the geosynchronous orbits of four satellites at a certain time are indicated by 114, 115, 116, 117. The satellites required for measurement of range are shown to be connected with chain lines. The chain lines properly bend, indicating that four satellites are distributed over a wide area.

When a certain time has passed, the satellites move from the positions 101, 102, 103 to the positions 104, 105, 106 as shown on the circle 100 and are distributed to take the four positions 118, 119, 120, 121.

A method of measuring ranges between an observation point and satellites will then be explained hereunder. The present invention basically measures the difference between the ranges between the observation point and two satellites. Considering an example of the satellites A and B in FIG. 8, the difference between the ranges AP and BP is to be measured. The difference in range, AP BP, can be measured if the satellites A and B generate signals simultaneously and such signals are received at the observation point P so as to measure the difference between arriving times of two signals. This method could be realized when the satellites A and B have clocks indicating the same time.

The present invention assumes that respective satellites have clocks which do not always indicate the same time. A signal generated by the satellite A is used for measurement of the range between the observer and the satellite B, and thus the signals passing through the paths AP and AB+BP are measured. The range AB can be measured by transmitting a signal from the satellite A to the satellite B using a satellite communication system, or may be calculated utilizing a fact that the positions of two satellites are already determined. The range AB is subtracted from the result of measurement of range AB+BP, whereby the difference between the ranges between AP and BP can equivalently be measured.

Consider the case where a signal is transmitted from the satellite A through the path A-B-P. Four satellites move along geosynchronous orbits having a large inclination angle and therefore these are separated in maximum by 8,600 km to the South or North from the equatorial plane. Then the maximum range between adjacent satellites becomes 31,500 km $$[= \sqrt{26,400^2 + (8,600 \times 2)^2}\,].$$

Actually, the ranges between all satellites do not attain such a value. When the maximum values are considered here, the maximum value $(ABP)_{max}$ of the path ABP becomes as follows:
$$31,500 + 36,000 = 67,500 \text{ km} \quad (20)$$

Since the velocity of light is $3 \times 10^8$ m/sec, the time required by the signal transmitted through the range $(ABP)_{max}$ becomes as follows:

$$67,500/(3 \times 10^5) = 0.225 \text{ seconds} \quad (21)$$

Figure 13:
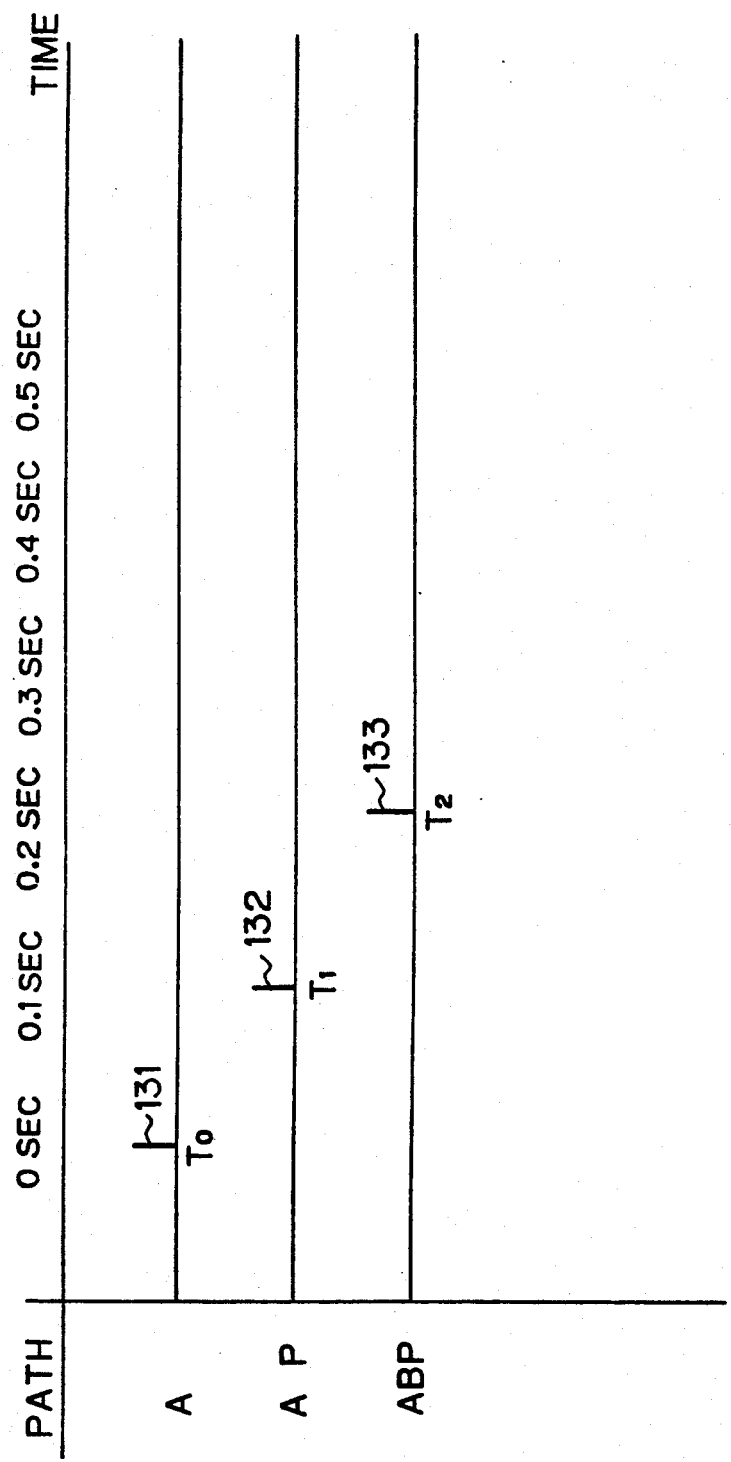
FIG. 13 illustrates a method of measuring a difference between the ranges between two satellites and an observation point in the positioning method according to the present invention.

Under this condition, a positioning method of the present invention will be explained with reference to FIG. 13.

The satellite A generates a reference pulse 131 at a certain time $T_0$. The observation point P receives the reference pulse 131 directly at the time $T_1$ and also receives the reference pulse 133 at the time $T_2$ from the satellite B.

The difference in range required for calculating hyperboloids for positioning the observation point can be obtained from the following formula:
$$|AP - BP| = |AP - ABP - AB| \quad (22)$$

Here, $|AP < ABP| = (T_2 - T_1)/C$

Where C indicates the velocity of light and ranges AB, BC can be obtained from the orbital positions of the satellites.

The observation point P is merely provided with a receiver for executing such a range measurement. The positioning method by the present invention requires that orbital positions of the satellites should be accurately determined.

Orbits of satellites are decided by measuring in the control station the ranges between the control station and the satellites and a rate of change in such ranges and then calculating the orbits of respective satellites based on the acquired data. Future orbital positions can be predicted utilizing positions of satellites indicated as the function of time.

In the present invention, artificial satellites are located in geosynchronous orbits so that a predetermined number of satellites can always be observed from the control station, and this control station is capable of accurately calibrating clocks of the satellites by observing times when signals are transmitted from the satellites and times when such signals are received. As a result, the satellites have highly precise clocks. Since the control station can obtain highly calibrated time information from the primary time standard of the country, it is possible to control the time by coordinating operations in relation to the primary time standard of the country, the control station and the satellites. Namely, the control station is capable of comparing time signals received from the satellites in standard time on the earth after compensating the received signals with time lags caused during transmission of the signals and which can be obtained from the orbital information about the satellites stored in the control station.

Figure 14:
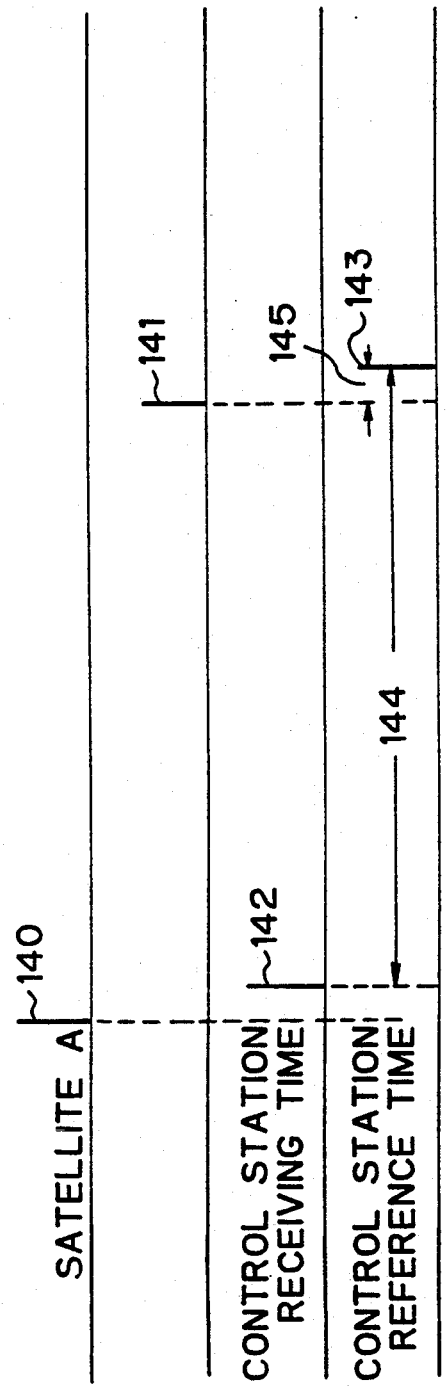
FIG. 14 illustrates how a clock provided in a satellite is calibrated in the positioning method according to the present invention.

Such a process will be explained with reference to FIG. 14. Here, it is assumed that the satellite A transmits a signal at a time 140. The control station receives this signal at a time 141. A time 142 indicates a calibrated reference time in the control station. The control station calculates, on the basis of the decided orbital values, a time 143 at which the signal from the satellite A is to be received. An interval 144 indicates a time period required for transmission of the signal and obtained from the orbital values by the control station, and an interval 145 indicates a time difference between the time 141 and the time 143.

Upon detection of the time difference 145, the control station sends this difference as a command to the satellite A for the purpose of time correction, whereby the satellite can keep the clock highly precise.

Detection of a time difference is not carried out only once at a certain time, but may be conducted sequentially over a comparatively long time period. This detecting method is superior for detection of time difference because small errors can accumulate and therefore be detected easily.

It is essential in the present invention to measure differences in range. For example, a measurement of time difference between the time $T_1$ and the time $T_2$ in FIG. 13 is necessary. For this measurement, the time $T_0$ at which the original signal 131 is generated is unnecessary information. However, one of the conditions for determining the position of the observation point P is that the positions of the satellites are determined at the time $T_0$ when the signal is generated. Since the positions of the satellites can be expressed as functions of time, the observation point P can obtain information for measuring differences in range and simultaneously detecting the time when the original signal 131 has been generated, by adding time information to the original signal 131 of FIG. 13 and sending such a signal to the observation point. This enables the positions of the satellites in cosmic space at a certain time to be known accurately.

Next, measurement of range will be explained. In the above explanation, the signal used for measurement is given as a pulse which indicates an instantaneous time. Measurement of range utilizing pulse waveform has been made in the field of radar. Apparatuses to be installed in ground stations would easily generate high amplitude pulses which often propagate over about 1,000 km. However, such apparatuses are not suitable for use in cosmic space, since the signals must transmit over very long distances and apparatuses of a large size are required for concentrating signal energy into pulse signals in a very short time for measurement of range. Accordingly, apparatuses to be used in cosmic space can be simplified by employing apparatuses which can transmit signals indicating time for a long period from the satellites and providing receivers which receive the signals for a long period.

The maximum range of transmission of signals required for measurement is about 67,600 km as estimated by the formula (21), and it is necessary that such a range can be encoded by an unambiguous code. When the basic clock is assumed to be 1 MHz, repetitive waveforms of about $0.225 \times 10^6$ exist between the maximum range of transmission.

Meanwhile, when a pseudo-random code (PRN code) is generated using a 20-bit shift register, $2^{20} - 1 = 10,048,575$ peculiar patterns can be generated. If a 0.9536752 MHz basic clock is selected, the 20-bit shift register can repeat such particular patterns every second. In a receiving side, a phase difference between two PRN codes, namely, the range between two satellites can be measured by executing correlational operations of two PRN codes received at different times. This measuring principle can be applied to measurement of the ranges between an observing point and satellites and between these satellites. Use of the PRN code provides advantages that a plurality of PRN codes can be used simultaneously even when the frequency is equal and that requirements of power flux density for avoiding signal interference can easily be satisfied.

Figure 15:
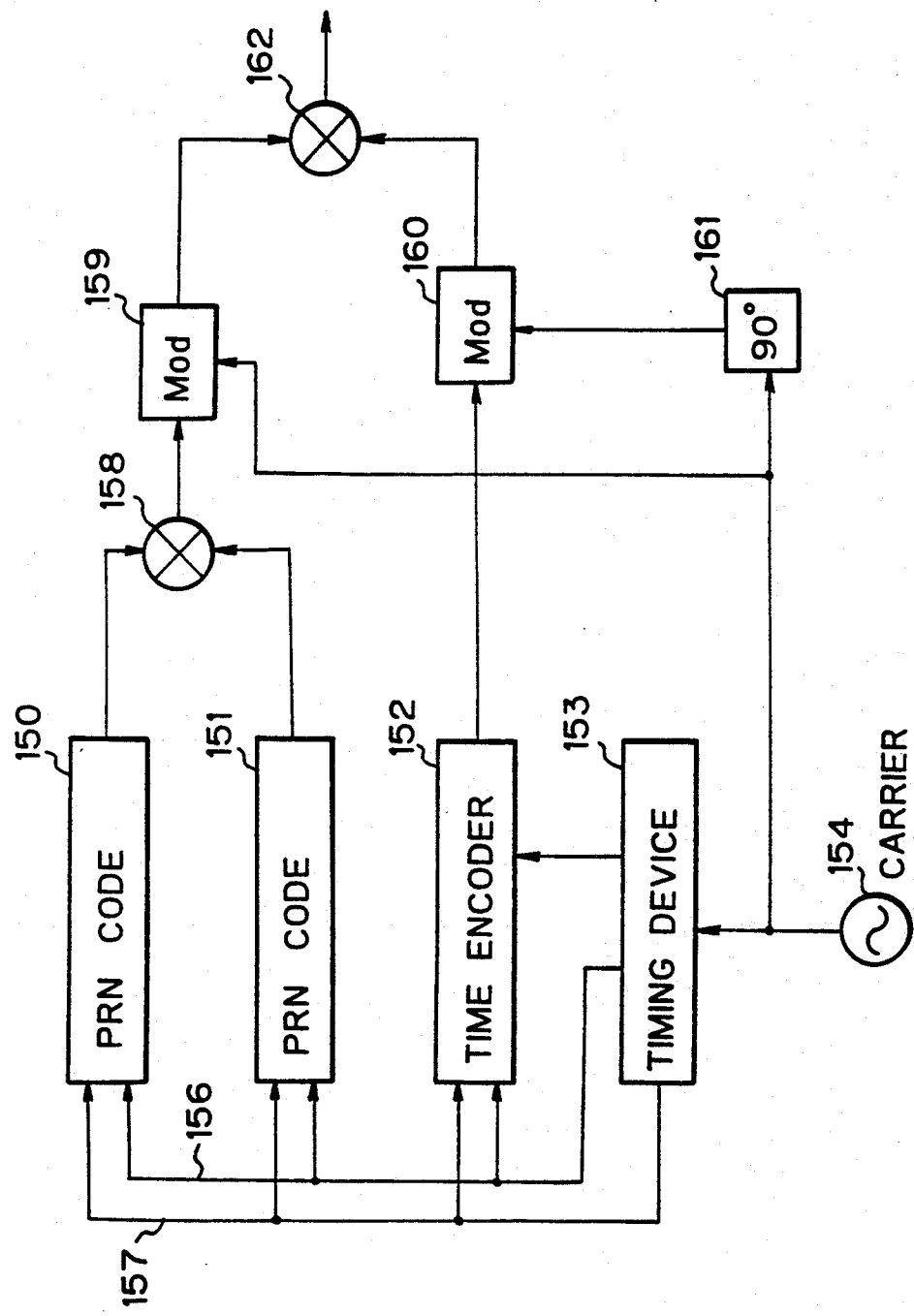
FIG. 15 shows a block diagram of an apparatus mounted in a satellite for transmitting a range measuring signal and a time signal in the positioning method according to the present invention.

An example of an apparatus to be mounted in a satellite in order to simultaneously transmit a range measuring signal and a time signal for measuring a difference in range at the observation point P or at the control station is shown in FIG. 15. In this figure, the reference numerals 150, 151 denote shift registers for generating a PRN code for measurement of range; 152 a time code generator; 153 a timing device; 154 a carrier wave source; 156 a clock signal for generating PRN code and time code; 157 a reset signal for resetting shift registers 150, 151 at an integral second time; 158 a MOD-2 adder for two PRN codes; 159, 160 modulators; 161 a 90° phase shifter for the carrier wave; and 162 a QPSK synthesizing circuit. These elements are connected with each other as shown in the figure.

In the present invention, if a clock frequency of the PRN code is set to 1 MHz, a range measuring signal obtained by synthesizing two PRN codes is required. The reason therefor will be explained later. The PRN codes generated by the shift registers 150, 151 are added in the MOD-2 adder 158 to generate a new PRN code. The carrier signal is modulated in the modulator 159 by the newly generated PRN code to generate a BPSK (Bi-phase shift keying) modulated signal.

The PRN code is reset to zero at each integral second time and is changed from the reset time. The reset timing is determined by the reset signal 157 obtained from the timing apparatus 153. The time code generator 152 is also driven by the clock signal 156 and outputs in synchronism with the clock signal, a current time read from the timing device 153 as a time code. The time code modulates the carrier wave which has a phase difference of 90 degrees from the phase of a range measuring signal, in the modulator 160. Since the range measuring signal and the time code are modulated orthogonally, these are combined in the synthesizing unit 162 to generate a QPSK signal.

The observation point P receives the range measuring signal and detects a time of generation of the range measuring signal.

Figure 16:
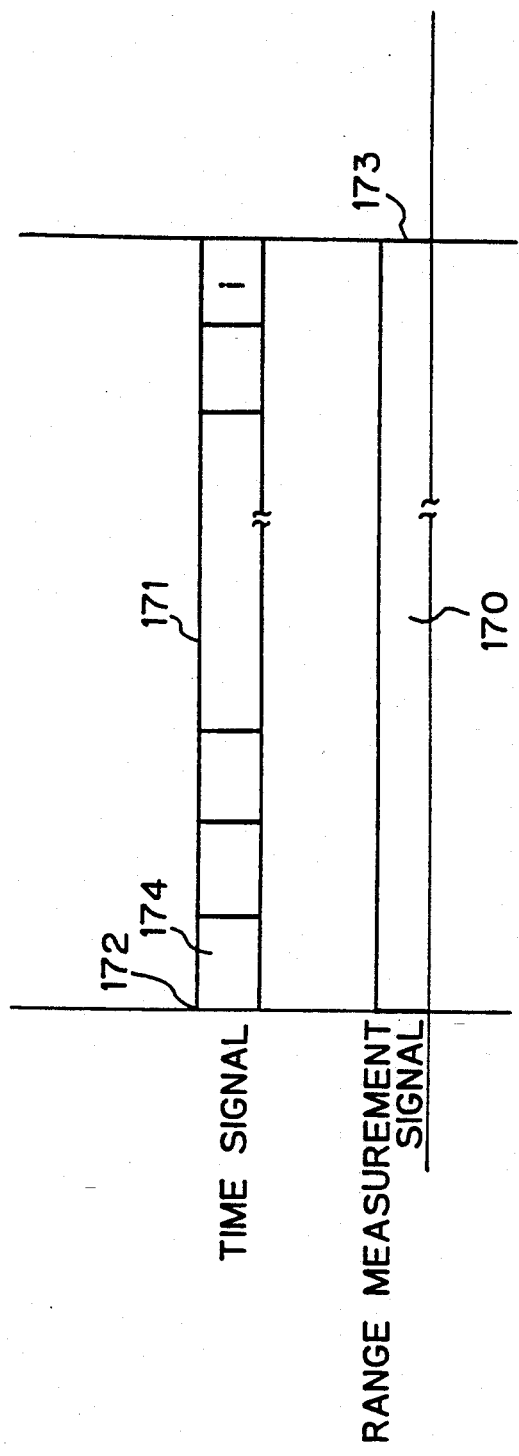
FIG. 16 is a diagram indicating a format of a signal transmitted from the apparatus of FIG. 15.

FIG. 16 shows a format of a QPSK signal generated by the synthesizing unit 162 of FIG. 15. A telemetry signal is not shown here. The QPSK signal includes a range measuring signal 170 and a time signal 171.

The range measuring signal 170 is cleared to zero at an integral second time 172 and continues for i seconds until a time 173. Counting of time continues from the time 172 until the time 173. The counted value is sequentially updated every integral second time from the time 172 and thus the time signal 171 includes a series of codes indicating respective times. Since the range measuring signal 170 is always accompanied by the time signal 171, the time when the range measuring signal 170 is generated in a satellite can be detected.

It is preferable that two signals 170, 171 are simultaneously cleared to zero at an integral second time.

Figure 17:
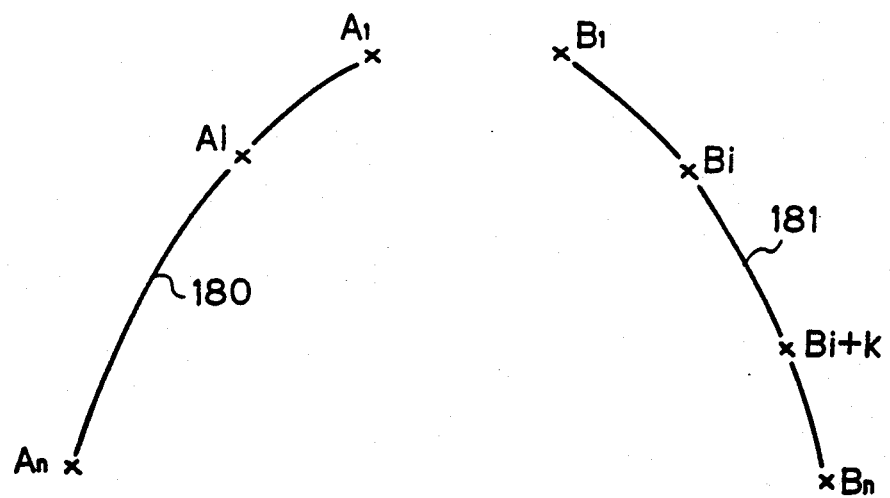
FIG. 17 is a diagram showing loci of two satellites.

Next, a method of actually measuring a difference in range by using such signal formats will be explained hereunder. FIG. 17 shows loci of satellites A and B. Here, it is assumed that the satellite A moves on an orbit 180, while the satellite B on an orbit 181, and that the satellite A is located at a position $A_1$ at a certain integral second of time. The satellite A starts transmission of a range measuring signal at a position $A_1$ and terminates the transmission thereof at a position $A_n$ after transmitting a cycle of the range measuring signal. The satellite B is located at a position $B_1$ when the satellite A is located at the position $A_1$ and move to a position $B_i$ when the satellite A is located at the position $A_i$. The signal transmitted when the satellite A is located at the position $A_i$ is received by the satellite B at a position $B_{i+k}$. When the satellite A is located at the position $A_n$, the satellite B is located at the position $B_{n'}$.

FIG. 18 indicates in detail signals transmitted within one second from the satellite A directly or through the satellite B to the observation point P. The satellite A generates a signal 191 at a time 190. The signal 191 includes a telemetry (TM) signal 203 and a range measuring (RM) signal 204 of the satellite A. The satellite B receives the signal 191 from the satellite A through satellite-to-satellite communication and transmits a signal 200 based on the received signal to the observation point P and a next adjacent satellite. The signal 200 includes a telemetry (TM) signal 205 of the satellite B and the range measuring (RM) signal 204 of the satellite A. The observation point P receives a signal 201 from the satellite A directly and a signal 202 from the satellite B. The signal 201 includes the signals 203 and 204, while the signal 202 includes the signals 204 and 205. The range measuring signal and telemetry signal included in the signal 191 are started synchronously at the time 190. $T_{AB}$ denotes a delay of the signal 191 propagating between A and B; $T_{AP}$ a delay of the signal 191 propagating between A and P; and $T_{ABP}$ a delay of the signal 191 propagating from A through B to P. The reference numeral 206 denotes a telemetry word representing the delay time $T_{AB}$.

The satellite A transmits the original signal 191 to the observation point P and the adjacent satellite B in a period of one second. The satellite B compares the phase of the signal 204 received from the satellite A with the phase of a range measuring signal which is generated in the satellite B and is repeated in every integral second time, measures the range between the satellitea A and B and then puts the result of measurement in an adequate word 206 in the telemetry frame. Thus the telemetry signal 203 generated by the satellite A is reedited by the satellite B and the reedited telemetry signal 205 is then transmitted to the observation point P. The observation point P receives the signals 201, 202 from two satellites A and B. By comparing the phases of the range measuring signals included in these two signals, a measurement of difference in range can be achieved. With reference to the time 190 at the satellite A, the difference between the propagation delay times $T_{AP}$ and $T_{ABP}$ can be measured. The time of this measurement can be detected from increments of time based on a combination of a code indicating the time 190 at the satellite A, the telemetry signals and the range measuring signals. The time when the signal 191 received from the satellite A through satellite communication reached the satellite B through can be detected by reading the progation delay time $T_{AB}$. As explained above, since the time at the satellites A and B can be detected, the positions of the satellites A and B can be calculated from orbital components. In other words, range measuring signals can be transmitted from the satellites of which positions are already known.

Figure 19A:
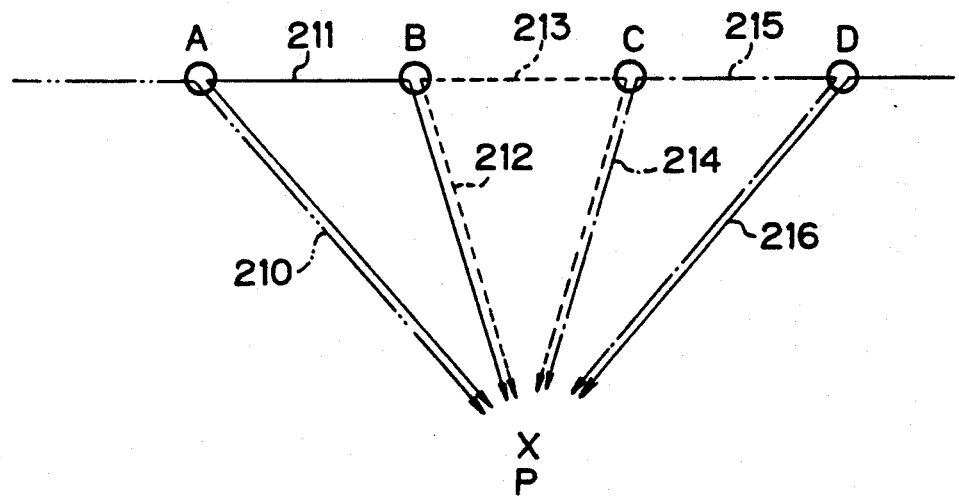
FIGS. 19A and 19B respectively show signal paths interconnecting four satellites, a control station and an observation point in the positioning method according to the present invention.
Figure 19B:
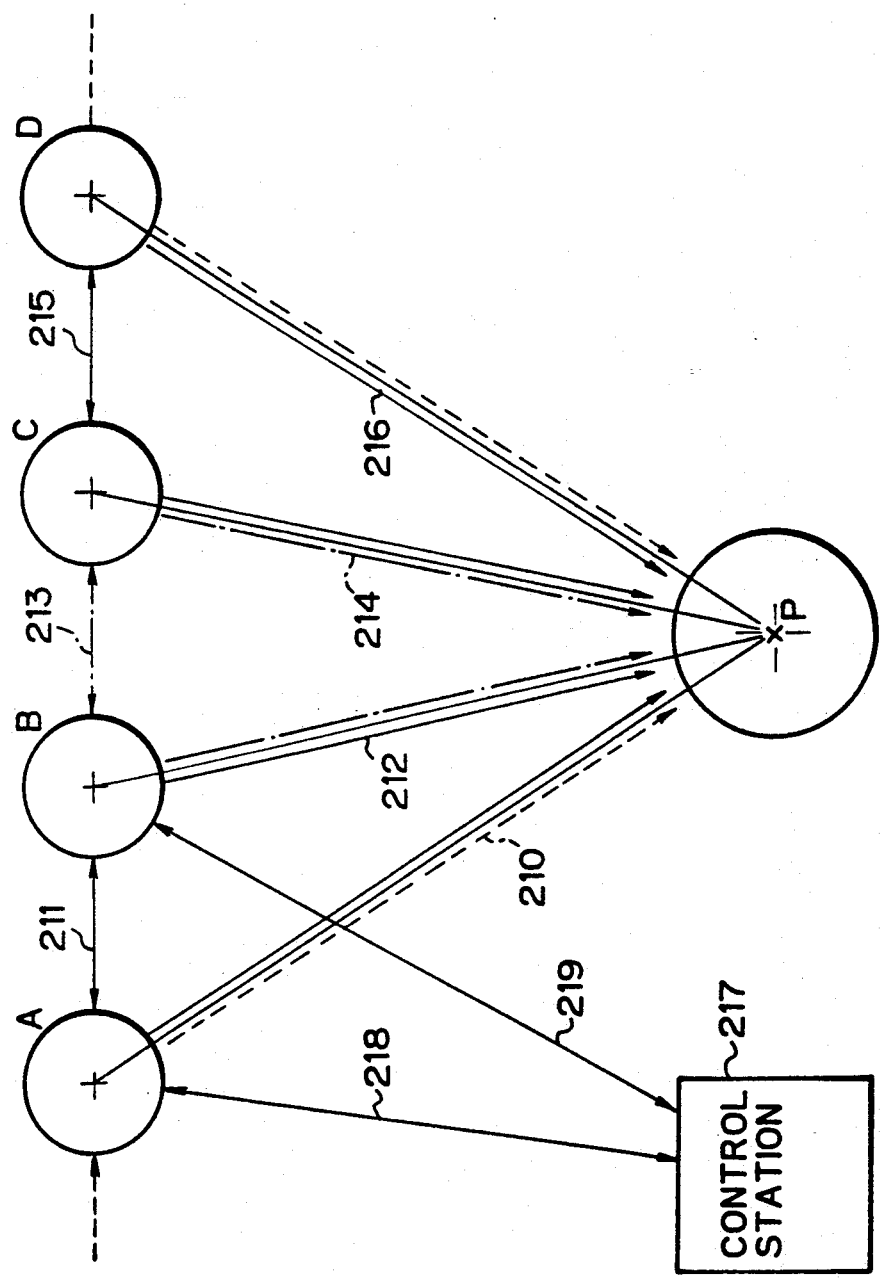

FIGS. 19A and 19B respectively show paths through which signals propagate when, for example, four satellites A, B, C, D are used. Arrows 210, 212, 214 and 216 show flows of signals from the satellites A, B, C, D to the observation point P, and numerals 211, 213, 215 indicate satellite communication channels between the satellites A and B, B and C, and C and D.

Numeral 217 denotes a control station installed on the ground. The following operations can be realized by providing feeder channel 218 interconnecting the satellite A and the control station 217 and telemetry command channel or feeder channel 219 interconnecting the satellite B and control station 217.

Neighboring two satellites form a pair so that adjacent two pairs include one common satellite, thus sequentially forming observation networks. The observation network is formed by the channels 210, 211, 212 in the case of the satellites A and B. Two signals, namely, a direct signal from one satellite and a signal via the other satellite are transmitted between those satellites and the observation point P. For calculation of the position of the observation point P, four satellites are necessary.

The observation point P is required to detect the time $T_{AB}$ indicating the range between the satellites A and B in order to determine the position of the satellite B from the signal 202 sent from the satellite A via the satellite B. Therefore, the satellite B transmits the received signal 191 to the observation point P through the singal path 212 and simultaneously transmits the same signal to the satellite A through the channel 211 interconnecting the satellites A and B. The satellite A transmits to the control station 217 through the feeder channel 218 the original signal 191 and the signal which is retransmitted by the satellite B and delayed by the time $2T_{AB}$. The control station 217 calculates the range between the satellites A and B by measuring the phase difference, namely, the time difference between those two signals. The $T_{AB}$ information obtained in the control station 217 is immediately transmitted to the satellite B as a command to the satellite B through the telemetry or feeder channel 219, and the satellite B immediately updates a relevant telemetry word 206.

Alternatively, the satellite A detects the phase difference between the original signal 191 and the signal 200 retransimitted from the satellite B to measure a time delay $T_{AB}$ and transmits the obtained $T_{AB}$ to the control station 217 through the feeder channel 218. The control station 217 sends the $T_{AB}$ information to the satellite B through the telemetry command or feeder channel 219 to cause the relevant telemetry word 206 to be immediately updated.

In the above two methods, the satellites and observation point transmit and receive signals, one being generated by the satellite directly opposite to the observation point and the other being relayed and transmitted by the neighbouring satellite. Meanwhile, it is possible to use a single signal so as to interconnect the satellites and the observation point. More specifically, the satellite A generates an original signal 191 and a range measuring signal 204 included in the signal 191 is started at an integral second time 190. This original signal is called a reference satellite signal. This signal is transmitted to all the satellites forming this system, B, C and D through the channels 211, 213, 215 interconnecting the satellites.

Each satellite PCM-restores a received signal and then transmits the restored signal to the next neighbouring satellite and the observation point P. A method of measuring the ranges between the satellites and a method of editing the result of measurement into the telemetry word are similar to those already described including operations of the control station 217. Signals other than the range measuring signal of the original signal may not be started at integral second times, but, since the control station 217 has already measured the ranges between the satellites, the times when the signals pass through the respective satellites can be calculated as time differences from the start of transmission of the original signal 191. This difference value is given to each satellite with the same method as that in which the control station 217 gives the difference between the ranges between satellites to each satellite, thereby inserting the difference in range in the telemetry word of the transmitting signal of each satellite as the time signal. Thus, a single range measuring signal is transmitted through the channels 210, 212, 214, 216 interconnecting the satellites and the observation point P and all the signals for detecting the positions can be prepared by including satellite-to-satellite range information and time information within the telemetry signals.

In this explanation, a range signal of the satellite A is started at every integral second time in consideration of convenience for daily life at the observing point P, but such a condition is not essential. When a relationship between a range measuring signal and the time is inserted in a telemetry word in a signal from any satellite, it means that all information required for position determination is included.

Ten satellites are necessary for covering the entire surface of the earth and an observation network for position determination can be formed by the expanding a signal system such as shown in FIG. 19.

FIG. 20 shows a block diagram of a transceiver in a satellite according to the present invention.

Numerals 223, 238 denote phased array antennas; 224 an antenna element; 225 a phase shifter; 227 a low-noise amplifier; 228 a PRN code decoding circuit and phase lock loop (PLL); 229 a local code generator; 230 a unit including shift registers (code generator) 151, 152, a timer 153 and a carrier wave source (crystal oscillator) 154; 231 a phase difference detecting circuit; 232 a navigation data generator; 233 a telemetry command subsystem; 234, 235 modulators; 236, 237 output amplifiers; and 240 an antenna directed to the observation point P.

A reference signal of the satellite is generated by the crystal oscillator 154 which is stabilized within a thermostatic oven. The time and frequency at a ground station are kept highly precise through comparison with the primary time standard of the country and can be calibrated as required. A compensation coefficient is input to the navigation data generator 232 through the telemetry command subsystem 233 and is edited to a telemetry value. A PRN code for range measurement sent from the shift registers 150, 151 as well as the telemetry data modulates the carrier in the modulator 235. The outputs of the modulators 234, 235 are sent through the antenna 240 to the observation point P. Only a range measuring signal is transmitted to the neighbouring satellite through the output amplifier 236 and the satellite communication antenna 238. Since the range measuring signal, utilizing the PRN codes, has an intensive correlation characteristic with a local signal, the range measuring signal can be transmitted beween the satellites in a narrow bandwidth. Therefore, the antennas are not required to have high gains. When the attitude control accuracy of the satellite is expected to be of 0.1 to 0.05 degrees, if the beam width is larger than 1 degree, automatic tracking by antenna is no longer necessary, thereby simplifying the construction of the satellite. Moreover, control of an antenna beam can be simplified by electronically controlling the array antenna. It is possible to form a satellite communication receiving antenna in a similar fashion.

A signal from the neighboring satellite is received by the antenna 223, amplified by the low-noise amplifier 227, and then compared with a local code of the local code generator 229 in the PRN code decoding circuit and PLL 228, thereby conducting code regeneration and phase synchronization. A phase difference between the regenerated code and the code generated from the code generator 150, 151 is detected by the phase difference detector 231. This value is input to the navigation data generator 232 as a part of navigation data and is edited to a telemetry value. The carrier is modulated in the modulator 234 by this telemetry value as well as by the range measuring signal which is output from the PRN code decoding circuit 228 after decoding the PRN code received from the neighbouring satellite. The modulated carrier wave is amplified by the output amplifier 237 and is then transmitted to the observation point P from the antenna 240.

Figure 21:
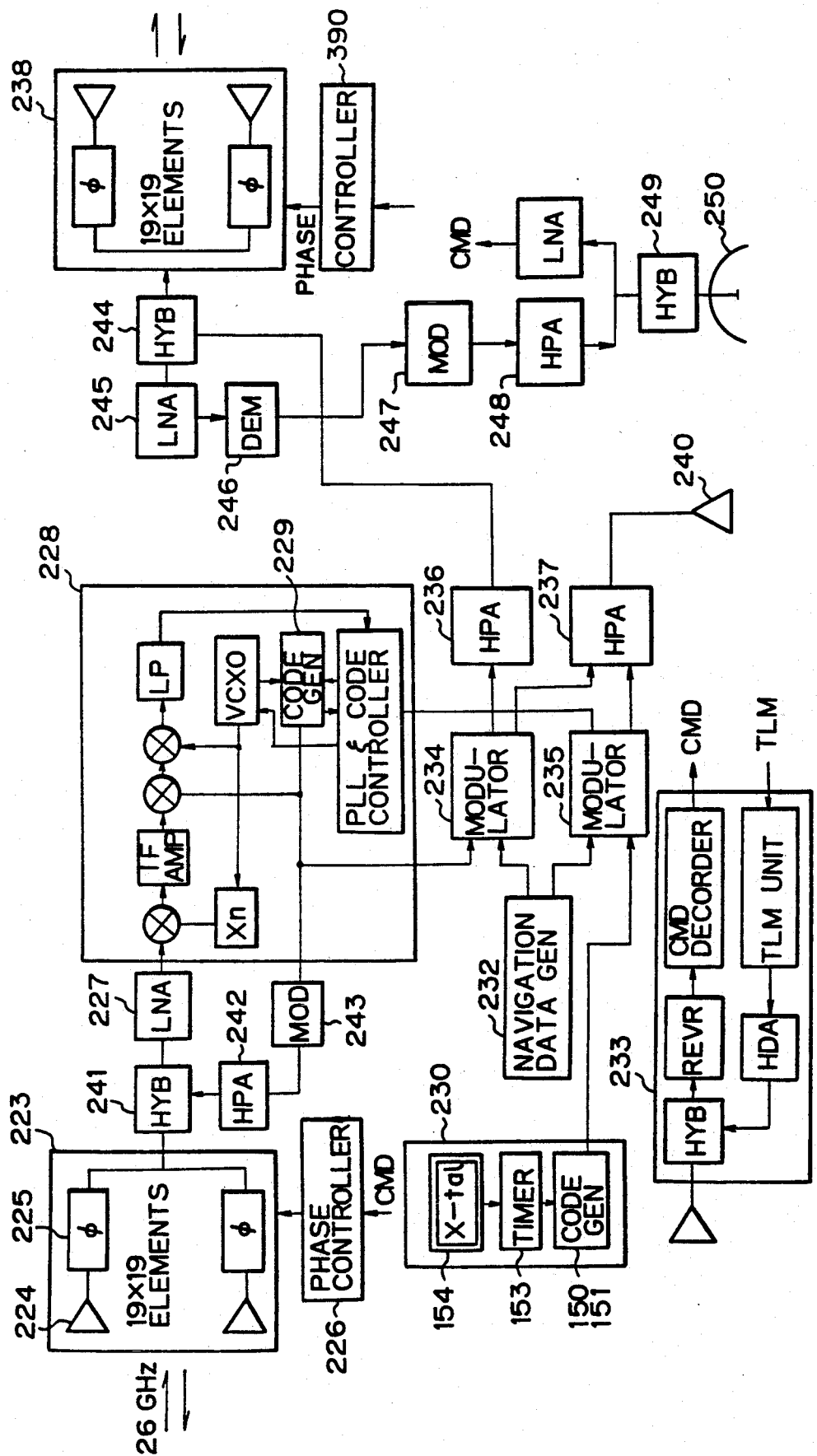
FIG. 21 is a diagram indicating a modification to the transceiver shown in FIG. 20.

FIG. 21 is a block diagram showing a modification of the transceiver of FIG. 20. The elements of FIG. 20 and corresponding elements in FIG. 21 are denoted by the similar reference numerals. In FIG. 21, bybrid ciruucits 241, 244, 249, high output amplifiers 242, 248, modulators 243, 247, low-noise amplifier 245, demodulator 246 and antenna 250 are further provided. A signal received by the antenna 233 from a preceding neighbouring satellite is amplified by the low-noise amplifier 227 and compared with a local code of the local code generator 229 in the PRN code decoding circuit and PLL 228, thereby effecting code regeneration and phase synchronization. Then the regenerated PRN code is transmitted to the subsequent neighbouring satellite and the observation point via the modulator 234 and simultaneously returned via the modulator 243 to the preceding neighbouring satellite as the transmission source. The control station detectes a value which indicates the range between the satellites, or the preceding satellite as the transmission source detects and transmits such a value to the control station 217. This value is then transmitted to the satellite through the feeder or telemetry channel 219, input to the navigation data generator 232 as a part of the navigation data and then edited in a telemetry value.

Explanations about the remaining operations are omitted here because the remaining operations are similar to those described in reference to FIG. 20.

In the present invention, artificial satellites are placed in geosynchronous orbits having a large inclination angle and four satellites can be observed at any time from an observation point. Therefore, an observer can easily determine his/her position, except for observers living in high latitude regions, such as polar areas, by the provision of a receiver, a simplified clock and a calculation algorithm.

What is claimed is:

1. A positioning method utilizing artificial satellites for determining the position of an observing point, the method comprising the steps of:
    disposing M satellites on geosynchronous altitude orbits having an inclination angle of about six degrees such that the means anomalies of neighbouring two satellites are separated from each other by about 120 degrees at the same time and that N (<M) satellites are simultaneously visible from said observation point;
    transmitting a range measuring signal, having a constant phase for an integral number of seconds based on a time signal calibrated by a control station, from a first one of said N satellites to said observation point and to a subsequent second satellite;
    reflecting the received range measuring signal from said second satellite to said first satellite;
    transmitting from said first satellite to said control station, the range measuring signal originally generated by said first satellite and the range measuring signal reflected by said second satellite;
    comparing the phase of the two range measuring signals in said control station to detect a phase difference therebetween;
    transmitting the phase difference from said control station to said second satellite;
    transmitting a phase comparison indicator and a range measuring signal, from said second satellite to said observation point, unique to said second satellite and also transmitting the range measuring signal unique to said second satellite from said second satellite to a neighbouring third satellite, thereby transmitting respective range measuring signals and phase comparison indicators from said N satellites to said observation point; and
    in said observation point, calculating, for each pair of neighbouring two satellites selected from said N satellites, a difference between the ranges between said neighbouring two satellites and said observation point on the basis of the times of arrival of the range measuring signals, the times of transmission thereof obtained from the range measuring signals and predicted positions of said N satellites, thereby determining the position of said observation point.

2. A positioning method according to claim 1, wherein a hyperboloid drawn by putting said neighbouring two satellites on the focal points is assumed for said each pair of neighbouring two satellites and the position of said observation point is determined as an intersecting point of those hyperboloids.

3. A positioning method utilizing artificial satellites to determine the position of an observing point, the method comprising the steps of:
    disposing M satellites on geosynchronous altitude orbits having an inclination angle of about six degrees such that the mean anomalies of neighbouring two satellites are separated from each other by about 120 degrees at the same time, and such that N (<M) satellites are simultaneously in the visibility of said observation point;
    transmitting a range measuring signal, having a constant phase for an integral number of seconds based on a time signal calibrated by a control station, from a first one of said N satellites to said observation point and a subsequent second satellite;
    reflecting the received range measuring signal from said second satellite to said first satellite;
    comparing the phase of the range measuring signal with the phase of the reflected range measuring signal in said first satellite to detect a phase difference therebetween;
    transmitting the phase difference via said control station to said second satellite;
    transmitting, from said second satellite to said observation point, a phase comparison indicator and a range measuring signal unique to said second satellite, and also transmitting the range measuring signal unique to said second satellite to a neighbouring third satellite, and transmitting respective range measuring signals and phase comparison indicator from others of said N satellites to said observation point; and
    in said observation point, calculating, for each pair of neighbouring two satellites selected from said N satellites, a difference between the ranges between said observation point and respective N satellites on the basis of the times of arrival of the range measuring signals, the times of transmission thereof obtained from the range measuring signals and predicted orbital positions of said N satellites, thereby determining the position of said observation point.

4. A positioning method according to claim 3, wherein a hyperboloid drawn by putting said neighbouring two satellites on the focal points is assumed for said each pair of neighbouring two satellites and the position of said observation point is determined as an intersecting point of those hyperboloids.

5. A positioning method utilizing artificial satellites to determine the position of an observation point, the method comprising the steps of:
    disposing M satellites in geosynchronous altitude orbits having an inclination angle of about six degree such that the mean anomalies of neighbouring two satellites are separated from each other by about 120 degrees at the same time, and such that N (<M) satellites are simultaneously in the visibility of said observation point;

transmitting a range measuring signal, having a constant phase for an integral number of seconds based on a time signal calibrated by a control station, from a first one of said N satellites to said observation point and to a subsequent second satellite;

in said second satellite, dividing the range measuring signal received from said first satellite into three subsignals and reflecting a first one of the subsignals to said first satellite;

in said first satellite, transmitting, to said control station the range measuring signal originally generated by said first satellite and the first one of the subsignals reflected by said second satellite, or a signal indicating the difference in the ranges between said first and second satellites as detected in said first satellite;

in said control station, detecting or receiving the ranges between said satellites, obtaining a time difference between said first and second satellites and transmitting, to said second satellite, signals indicative of the ranges and the time difference between said first and second satellites;

in said second satellite, transmitting a second one of said subsignals as well as the signal sent from said control station to said observation point, and also transmitting a third one of said subsignals to a subsequent third satellite, and transmitting respective range measuring signals and phase comparison information between said satellites to said observation point; and in said observation point, calculating differences between the ranges between said observation point and said satellites for each pair of neighbouring two satellites in the basis of the times of arrival of the range measuring signals, the times of transmission thereof obtained from the range measuring signals and predicted orbital positions of said N satellites, thereby determining the position of said observation point.

6. A positioning method according to claim 5, wherein a hyperboloid drawn by putting said neighbouring two satellites on the focal points is assumed for said each pair of neighbouring two satellites and the position of said observation point is determined as an intersecting point of those hyperboloids.

7. A positioning method utilizing artificial satellites to determine the position of an observation point, the method comprising the steps of:

disposing M satellites on geosynchronous orbits having an inclination angle of about six degrees such that the mean anomalies of neighbouring two satellites are separated from each other by about 120 degree at the same time and that N (<M) satellites are simultaneously in the visibility of said observation point;

transmitting a range measuring signal, having a constant phase for an integral number of seconds based on a time signal calibrated by a control station, from a first one of said N satellites to said observation point and a subsequent second satellite;

comparing, in said second satellite, the phase of the range measuring signal received from said first satellite with the phase of range measuring signal of said second satellite;

transmitting from said second satellite, said phase comparison information and the range measuring signal sent from said first satellite to said observation point and also transmitting the range measuring signal sent from said second satellite to a subsequent third satellite, and transmitting respective range measuring signals and phase comparison information from others of said N satellites to said observation point; and in said observation point, calculating, for each pair of neighbouring two satellites selected from said N satellites, a difference between the ranges between said observation point and said neighbouring two satellites on the basis of the times of arrival of the range measuring signals, the times of transmission thereof obtained from the range measuring signals and predicted orbital positions of said N satellites, thereby determining the position of said observation point.

8. A positioning method according to claim 7, wherein a hyperboloid drawn by putting said neighbouring two satellites on the focal points is assumed for said each pair of neighbouring two satellites and the position of said observation point is determined as an intersecting point of those hyperboloids.

* * * * *